Dec. 10, 1940.  J. B. JOHNSON ET AL  2,224,265
MULTIPLE SPINDLE MACHINE
Filed July 8, 1937  13 Sheets-Sheet 6
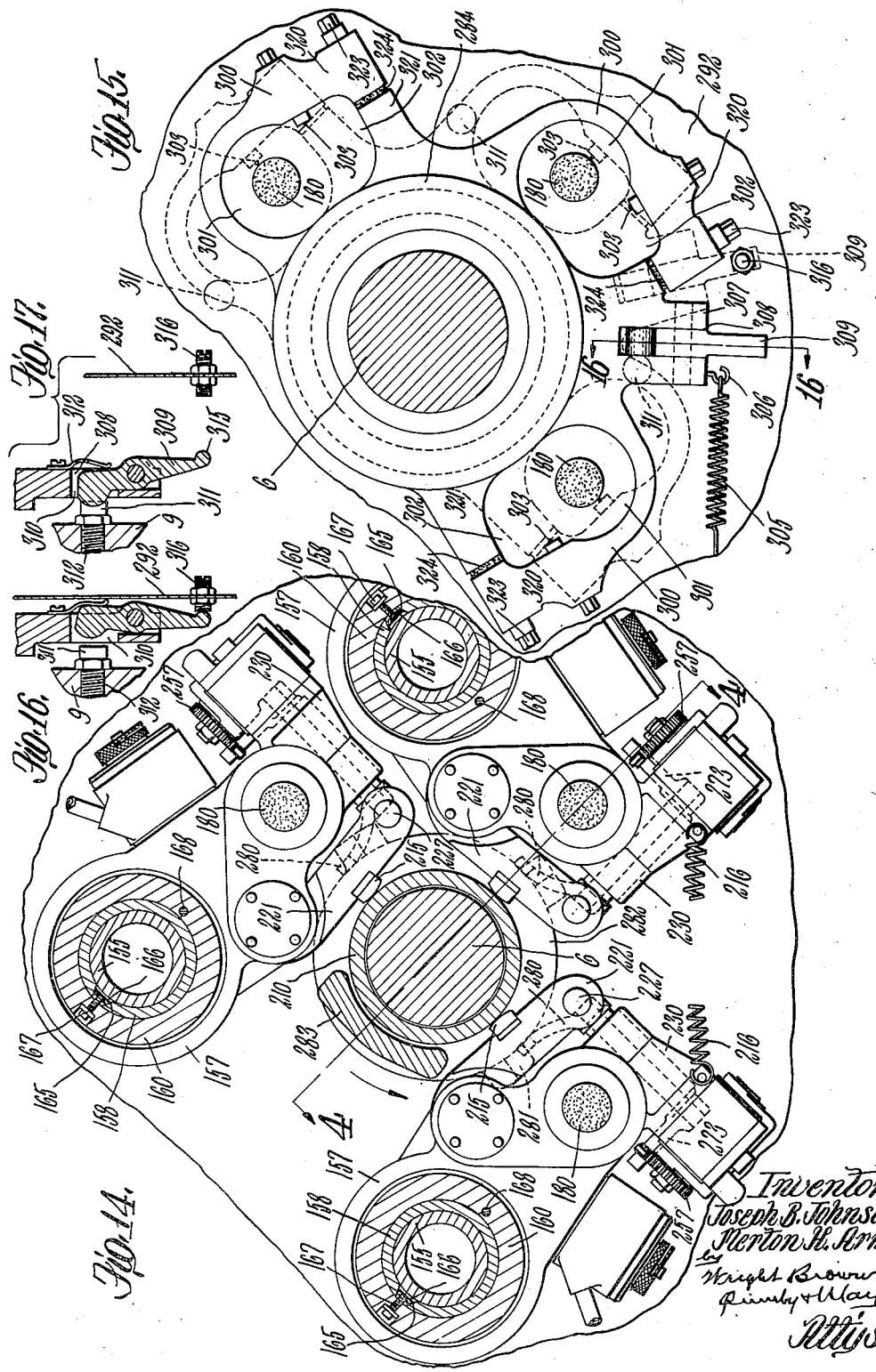

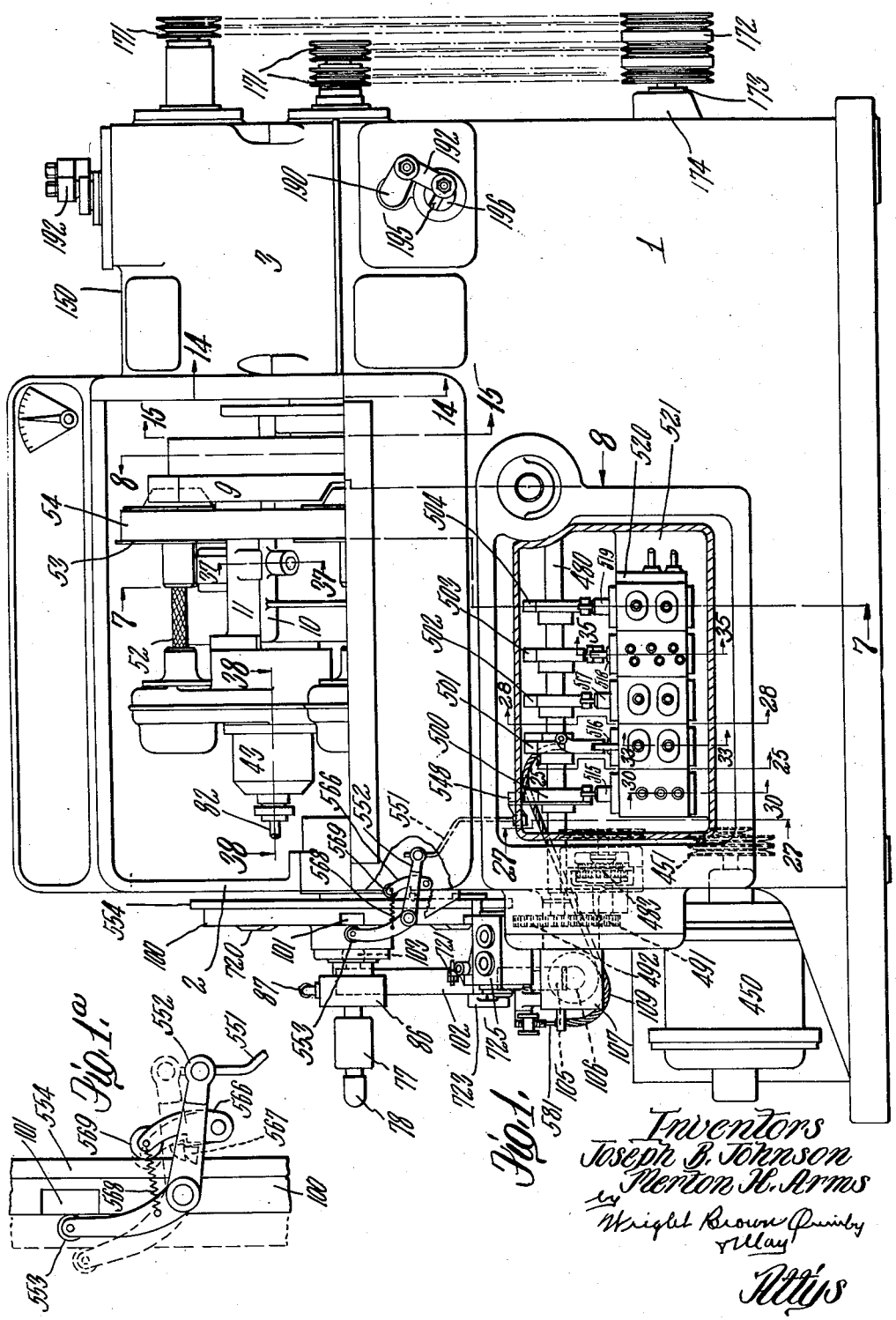

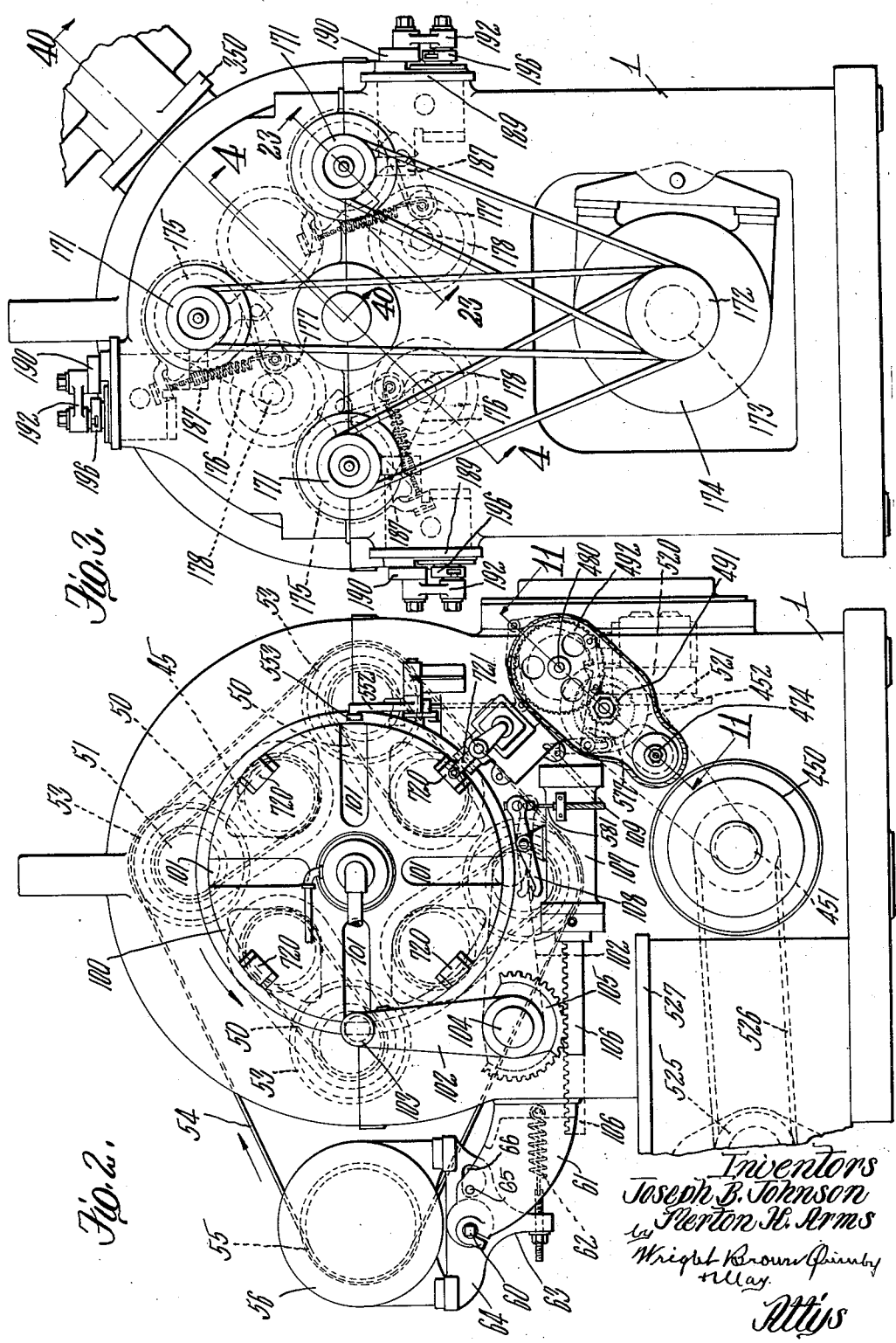

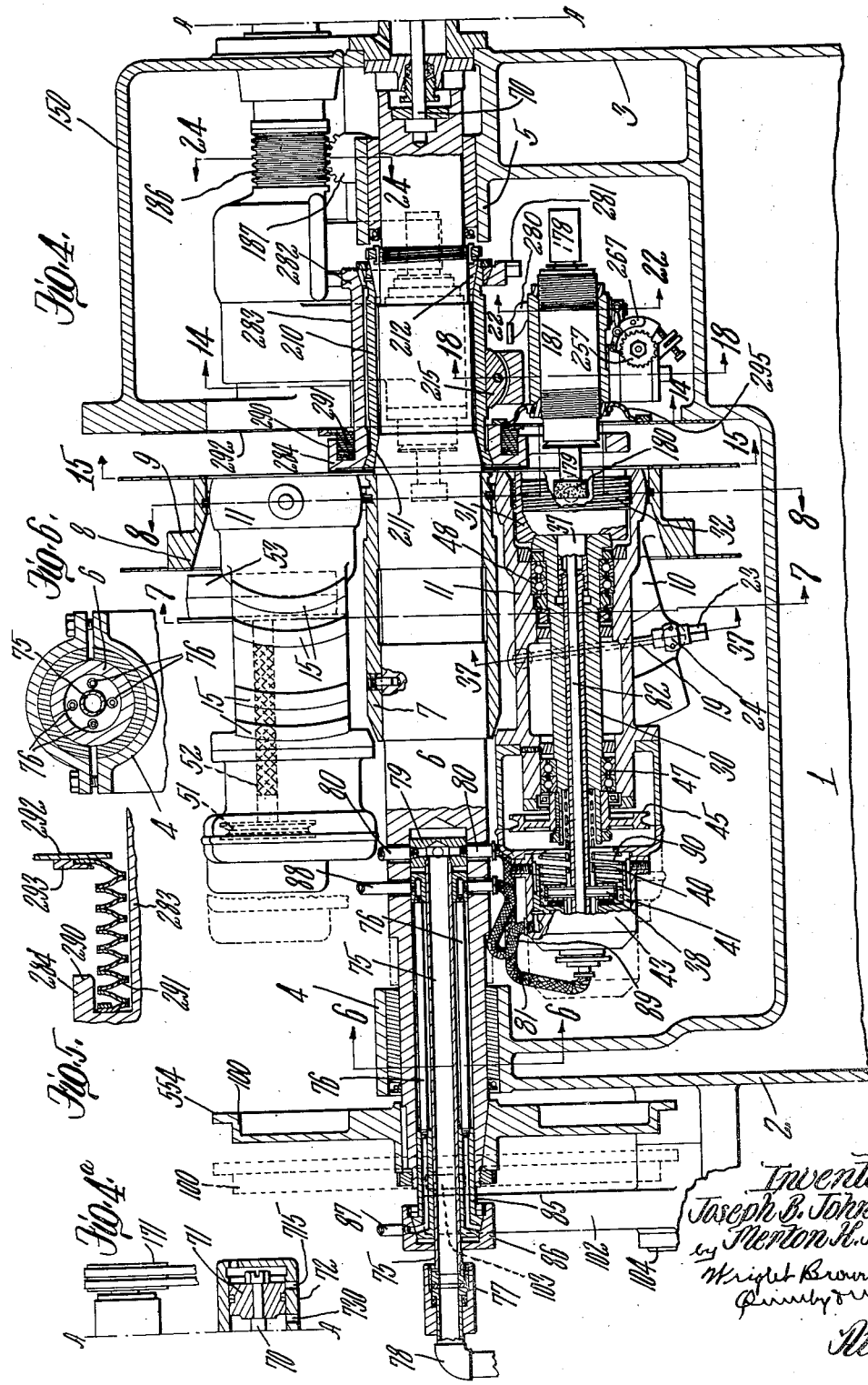

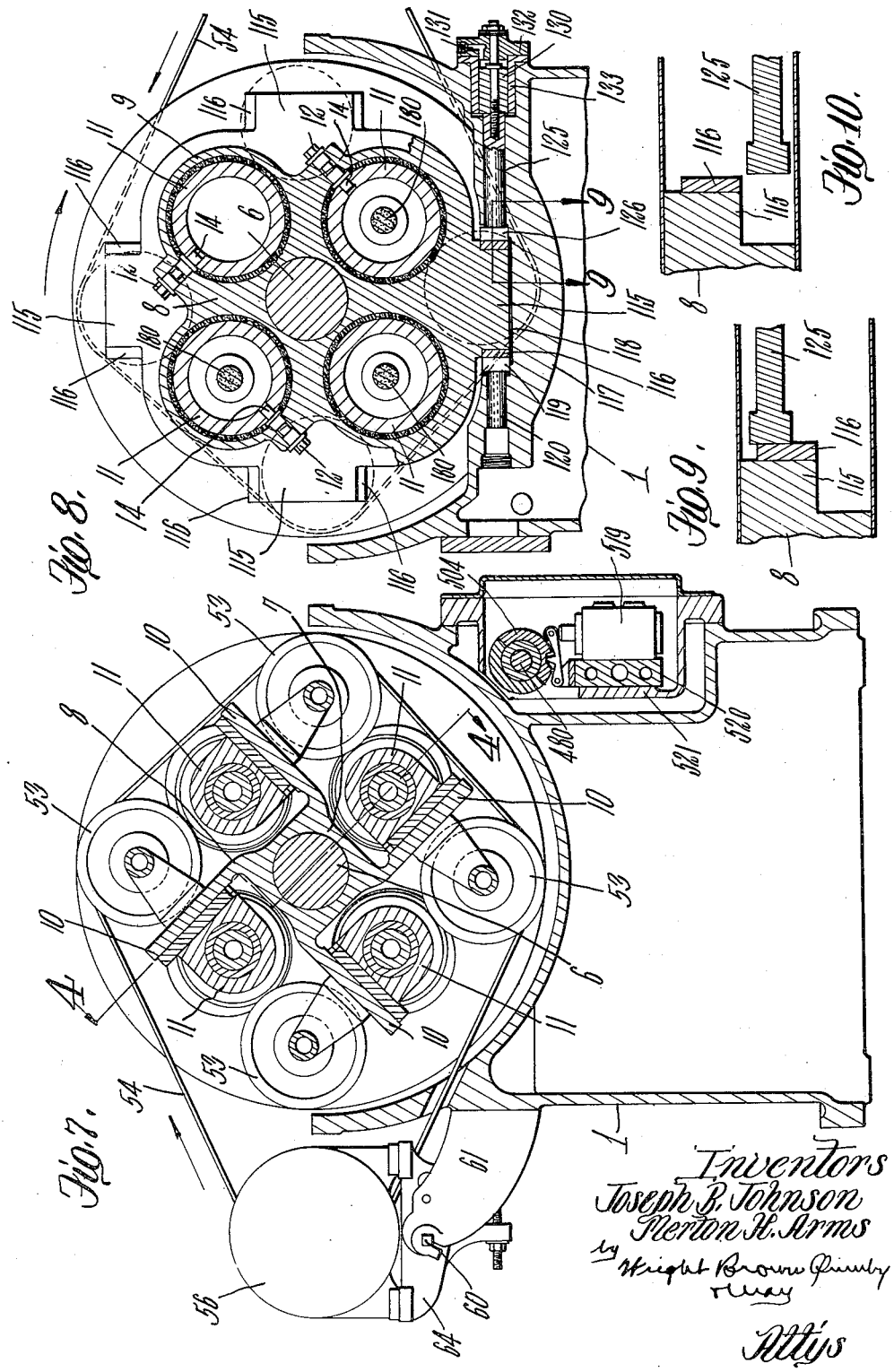

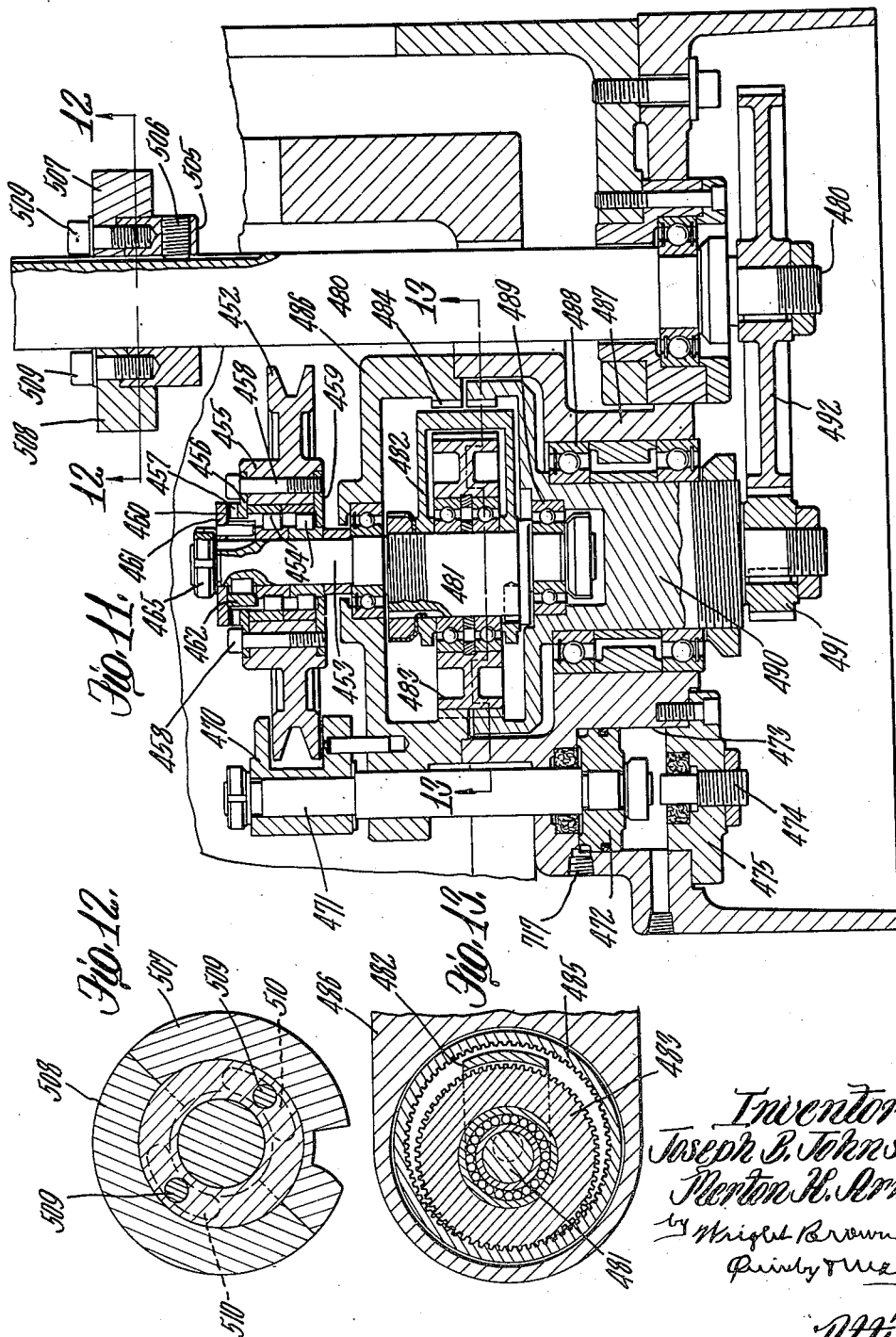

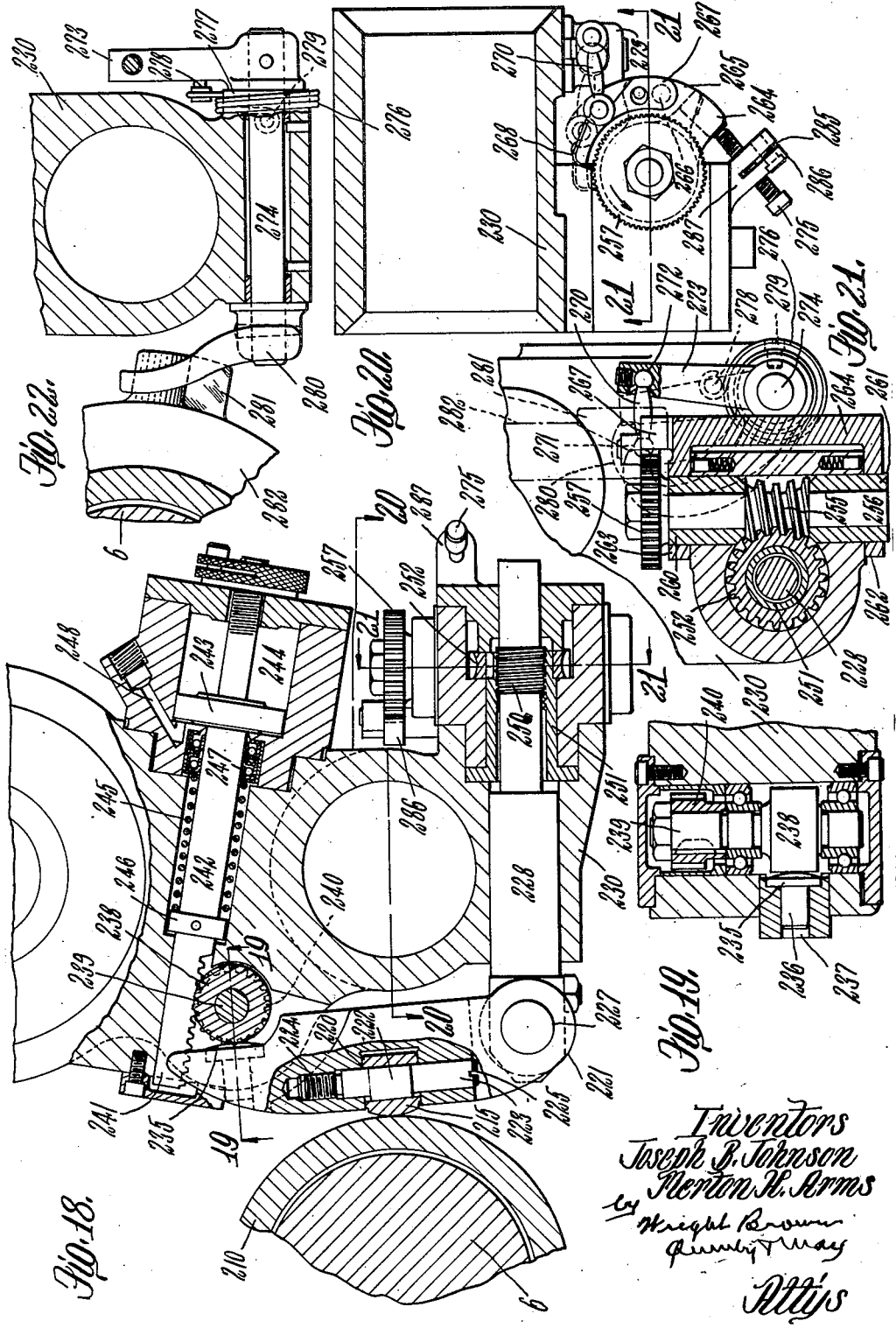

Dec. 10, 1940.   J. B. JOHNSON ET AL   2,224,265
MULTIPLE SPINDLE MACHINE
Filed July 8, 1937   13 Sheets-Sheet 8
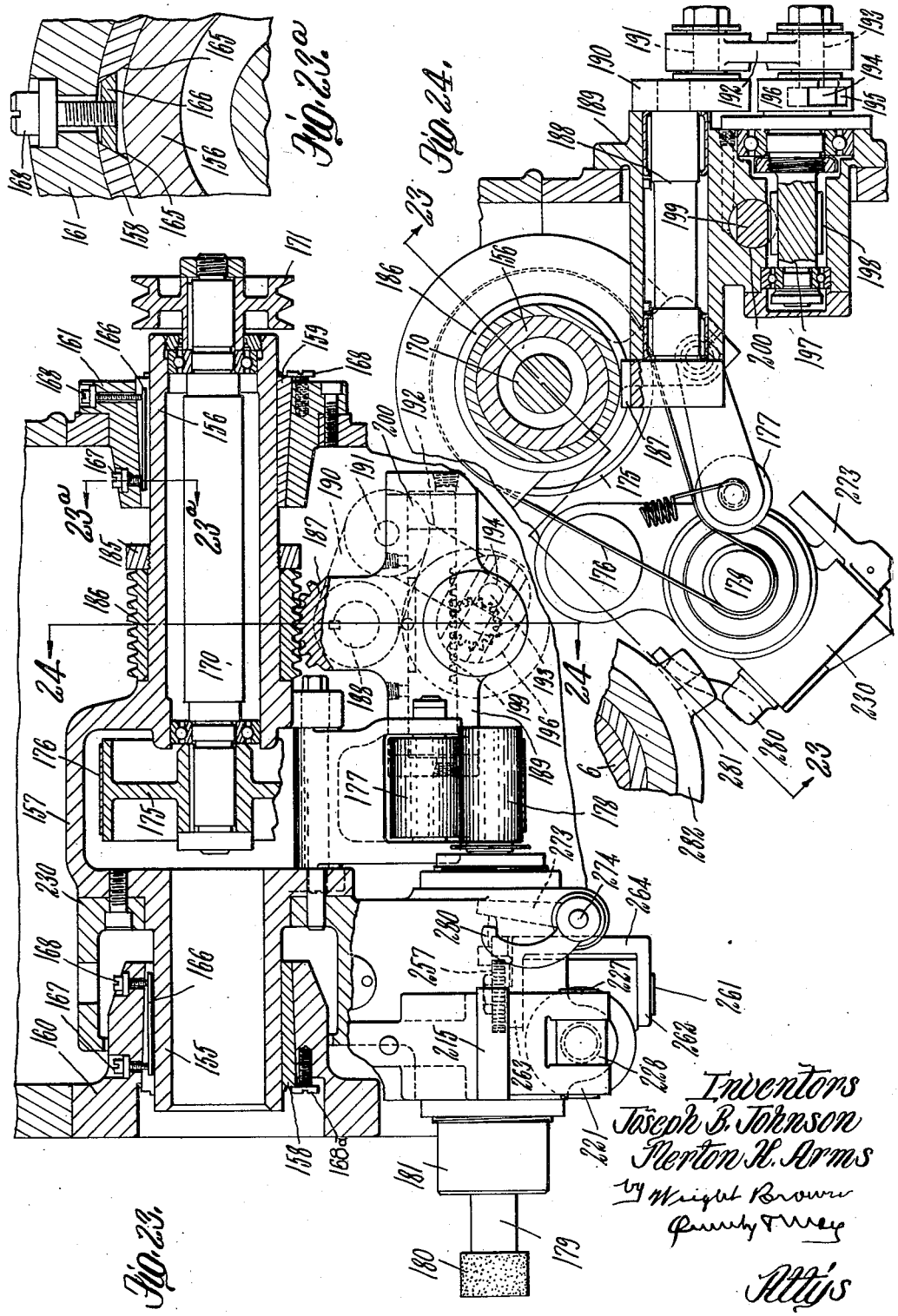
Inventors
Joseph B. Johnson
Merton H. Arms
by Wright Brown
Attys

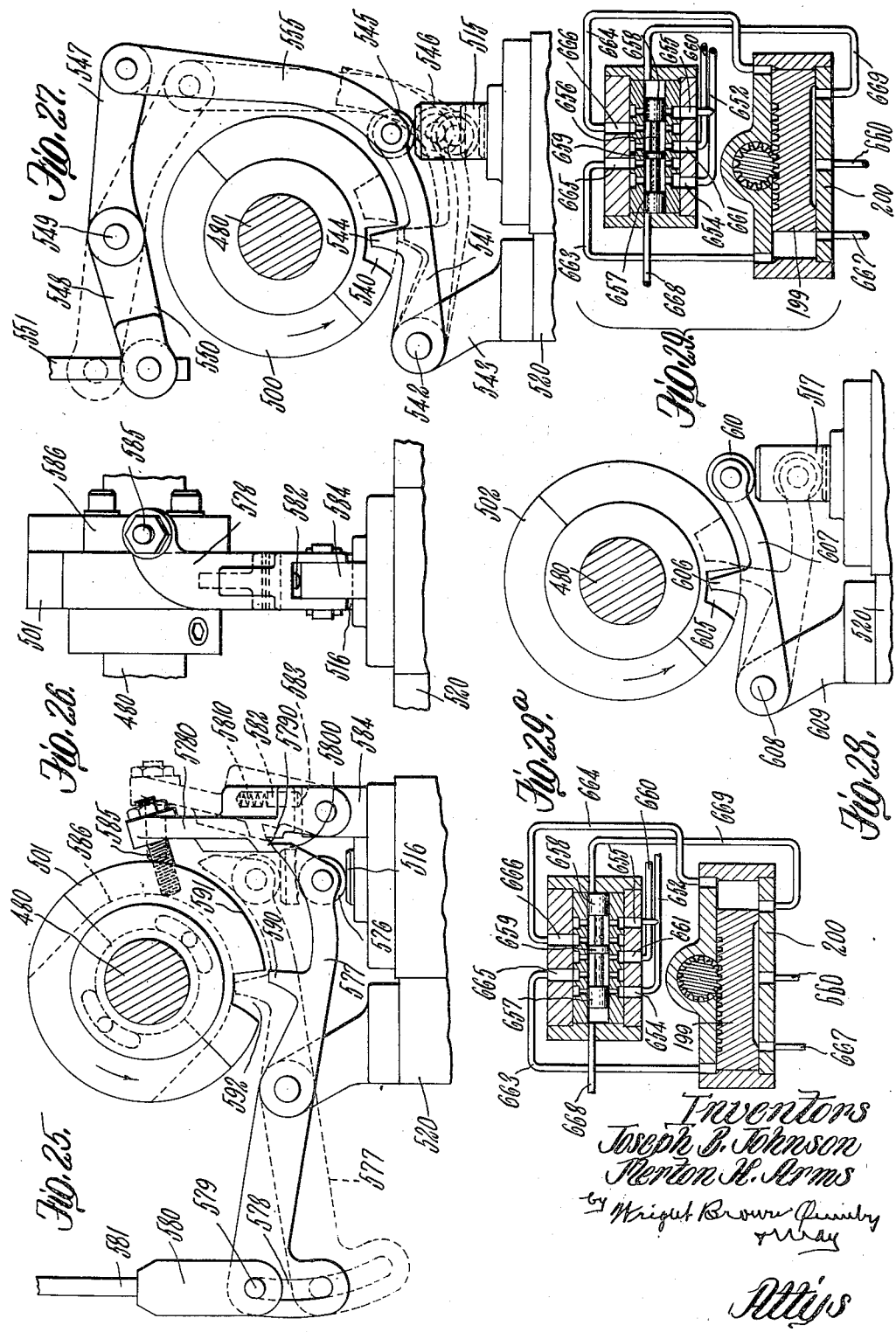

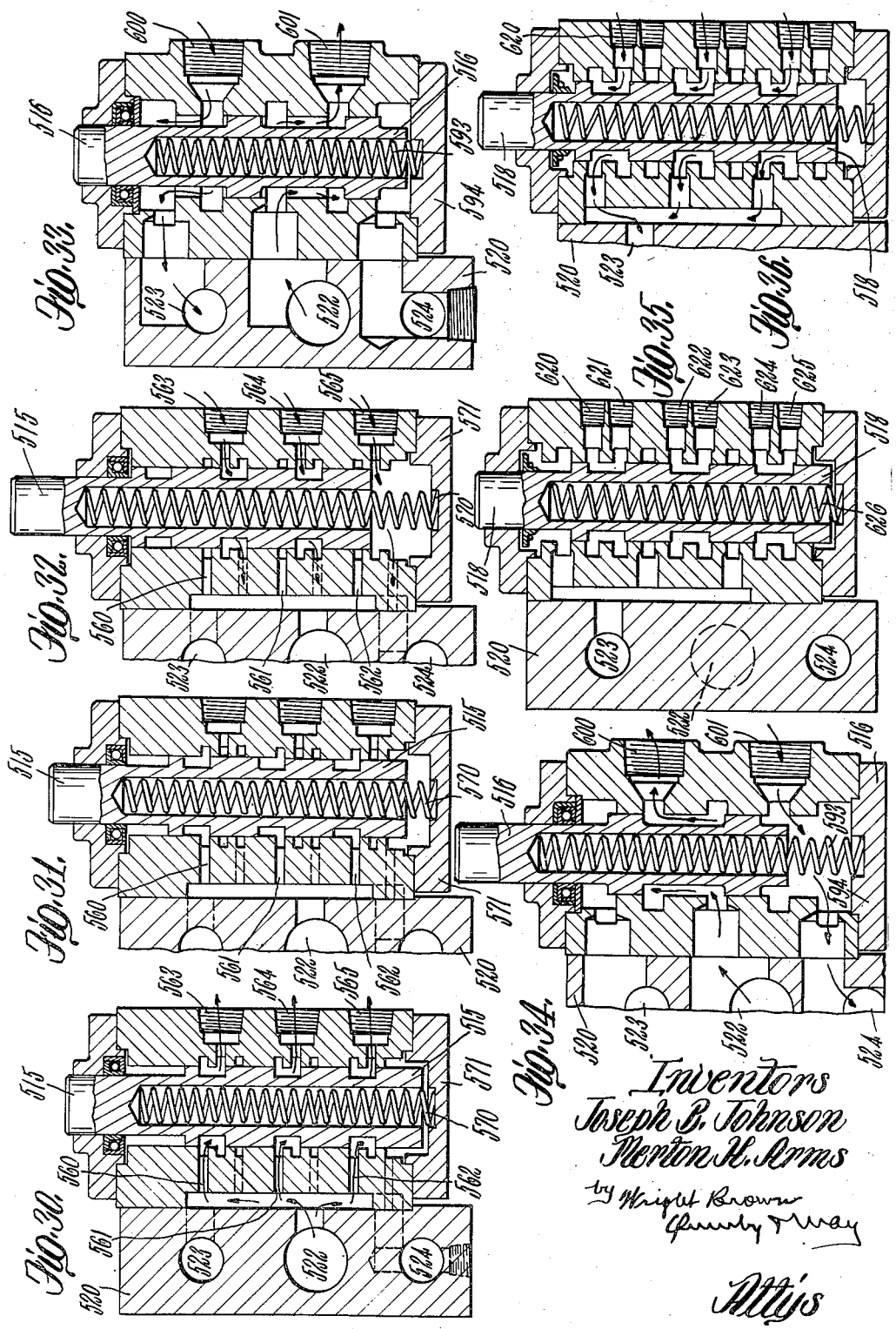

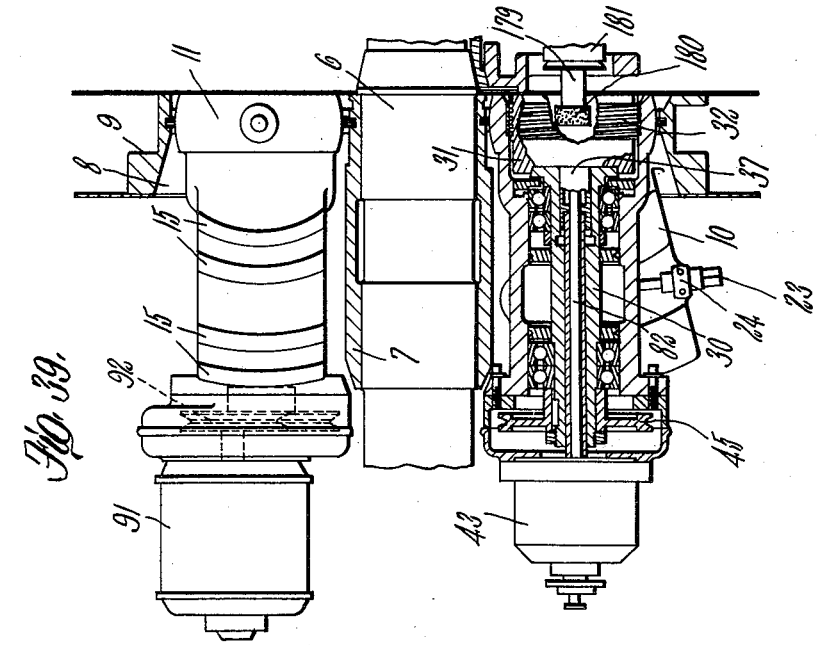

Dec. 10, 1940.  J. B. JOHNSON ET AL  2,224,265
MULTIPLE SPINDLE MACHINE
Filed July 8, 1937  13 Sheets-Sheet 12
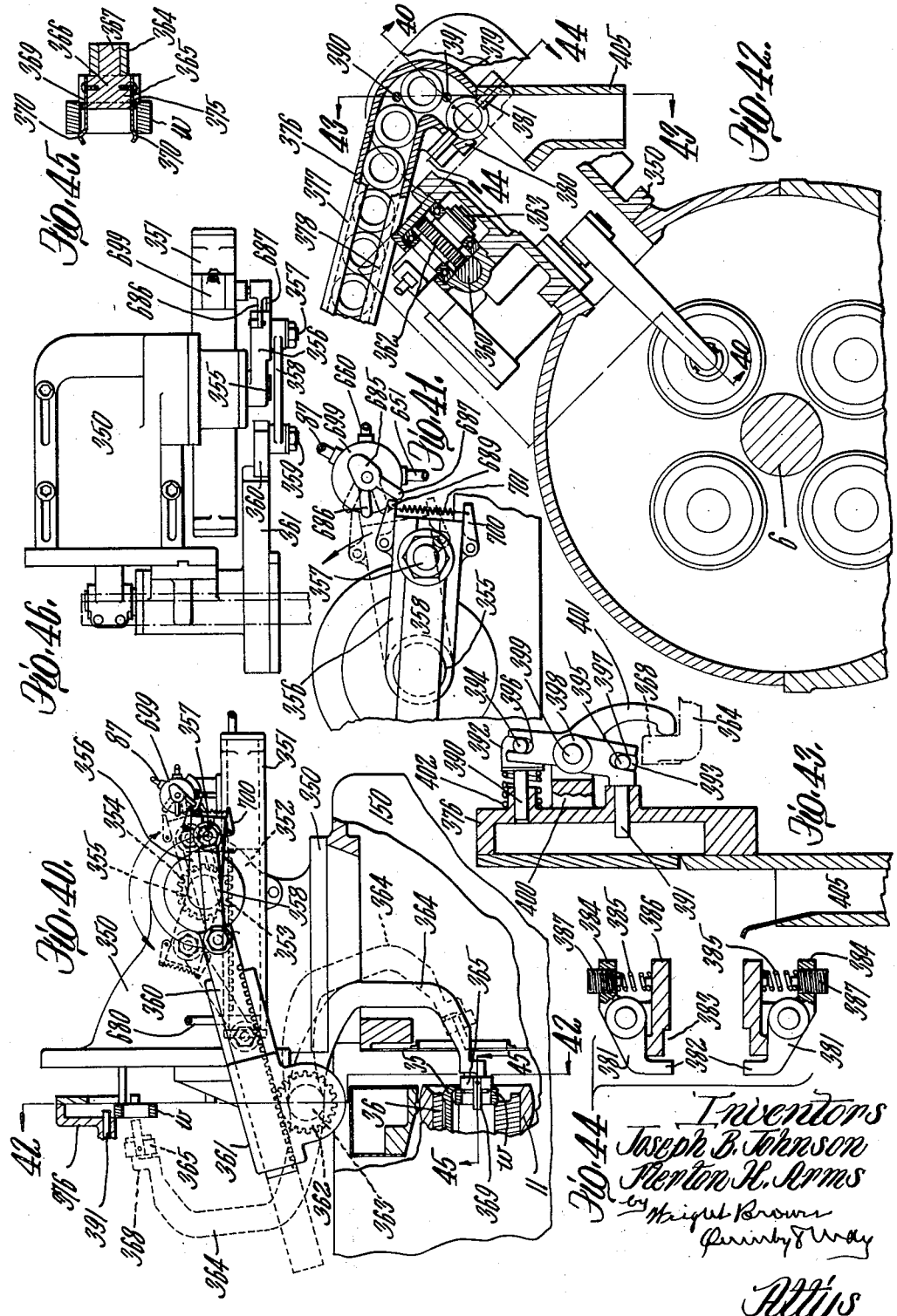
Inventors
Joseph B. Johnson
Merton H. Arms

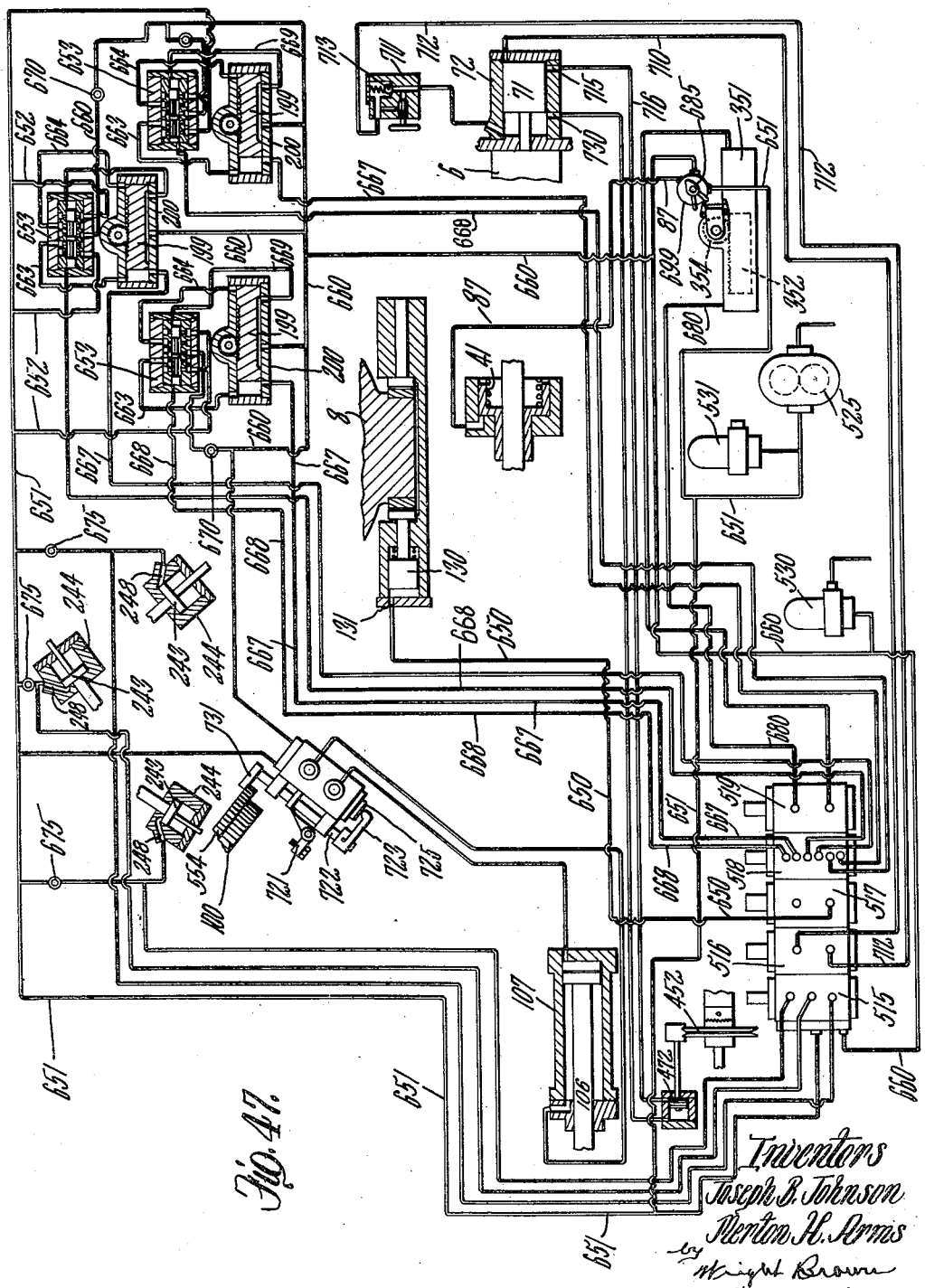

Patented Dec. 10, 1940

2,224,265

UNITED STATES PATENT OFFICE 2,224,265

MULTIPLE SPINDLE MACHINE

Joseph B. Johnson and Merton H. Arms, Springfield, Vt., assignors to Bryant Chucking Grinder Company, Springfield, Vt., a corporation of Vermont Application July 8, 1937, Serial No. 152,582

59 Claims. (Cl. 51—53)

This invention relates to multiple spindle machines, and more particularly to such machines where the operating tools are grinding wheels.

One of the objects of this invention is to provide for individual traverses of the several tools with respect to their respective work pieces.

A further object is to provide for independent angular adjustments of the tools relative to the axes of their respective work pieces.

Another object is to provide means whereby the work pieces are moved to retract or present them into operative relation to the tools so that the normal extent of traverse of the tools may remain unchanged. This, coupled with a dead center control of the traverse, prevents overtravel of the tools, which is of particular importance when working to shoulders and blind holes in the work.

Still another object is to provide for automatic truing of the tools or wheels to an independently adjustable extent when the work pieces are retracted.

A further object is to feed the tools relative to the work transverse to the relative indexing motion therebetween so that slight inaccuracies of indexing have negligible effect on size of the finished work.

Another object is to provide improved means for adjusting grinding wheel truing devices to compensate for wear and wheel truing.

A further object is to provide for means for adjusting relatively adjacent parts whereby high accuracy of work may be produced without requiring more than easily attained commercial accuracy in the machining of the parts.

A further object is to provide improved constructions for protecting bearings from access of foreign matter.

Further objects and advantages will appear from a more complete description of certain embodiments of the invention disclosed in the accompanying drawings, in which Figure 1 is a side elevation of a grinding machine embodying this invention.

Figure 1a is similar to a portion of Figure 1, but to a larger scale.

Figures 2 and 3 are left and right end elevations, respectively, of the machine.

Figures 4 and 4a, together constitute a section on line 4—4 on Figures 3, 7 and 14.

Figure 5 is a fragmentary sectional detail to a larger scale than Figure 4.

Figure 6 is a detail section on line 6—6 of Figure 4.

Figures 7 and 8 are detail sections on the correspondingly numbered section lines on Figures 1 and 4.

Figures 9 and 10 are cross sectional views on line 9—9 of Figure 8 showing two positions of the locking pin.

Figure 11 is a detail section on line 11—11 of Figure 2, but to a larger scale.

Figures 12 and 13 are detail sections on correspondingly numbered section lines of Figure 11, Figure 13 being on a smaller scale.

Figures 14 and 15 are detail sections on the correspondingly numbered section lines of Figures 1 and 4.

Figures 16 and 17 are cross sectional views on line 16—16 of Figure 15 and showing the driven mechanism in released and latched positions, respectively.

Figure 18 is a fragmentary section on line 18—18 of Figure 4.

Figures 19, 20 and 21 are detail sectional views on the correspondingly numbered section lines of Figure 18 and Figure 21 is also a sectional view on line 21—21 of Figure 20.

Figure 22 is a detail section on line 22—22 of Figure 4.

Figure 23 is a detail section on line 23—23 of Figures 3 and 24.

Figure 23a is a detail section to a larger scale on line 23a—23a of Figure 23.

Figure 24 is a sectional view on line 24—24 of Figures 4 and 23.

Figure 25 is a partial section on line 25—25 of Figure 1.

Figure 26 is a front elevation of the mechanism shown in Figure 25.

Figures 27 and 28 are partial cross sectional views on lines 27—27 and 28—28, respectively, of Figure 1.

Figures 29 and 29a are views to a larger scale of a portion of Figure 47, and showing the parts in different positions.

Figures 30 to 32, inclusive, are sectional views on line 30—30 of Figure 1, and showing the valve in different positions.

Figures 33 and 34 are detail sectional views on line 33—33 of Figure 1, and showing the valves in different positions.

Figures 35 and 36 are detail sections on line 35—35 of Figure 1, showing the valve in different positions.

Figure 37 is a detail section on line 37—37 of Figures 1 and 4.

Figure 38 is a detail section to a larger scale on line 38—38 of Figure 1.

Figure 39 is a view similar to a portion of Figure 4, but showing a modification.

Figure 40 is a detail section on line 40—40 of Figure 3 and Figure 42.

Figure 41 is a portion of Figure 40 to a larger scale.

Figure 42 is a sectional view on line 42—42 of Figure 40.

Figures 43 and 44 are detail sections to a larger scale on lines 43—43 and 44—44 of Figure 42.

Figure 45 is a detail section on line 45—45 of Figure 40 to a larger scale.

Figure 46 is a top plan of a portion of the machine shown in Figure 40.

Figure 47 is a diagram of the hydraulic system.

In the machine illustrated both the tools and the work are mounted for reciprocation in line with each other, the tools being reciprocated to effect traverse of the tools relative to the work, and the work being reciprocated to and from operative relation to the tools to begin the tooling operation and to withdraw the work from the tools after the tooling operation has been completed. When the tools are grinding wheels, these wheels may be trued while the work is out of grinding position, the truing devices being brought into operative positions for the truing operation. After truing has been effected, the truing tools are automatically retracted.

Work holders and mountings therefor

Referring first to Figures 1 and 4, at 1 is shown a machine base having a pair of standards 2 and 3 adjacent to opposite ends, these standards being provided with bearing sleeves 4 and 5, respectively. Mounted for rotary and reciprocatory motions in the bearings 4 and 5 is a shaft 6 which not only supports the work holders, but also, as will later more particularly appear, supports a guide for the tool holders. Secured to a portion of the shaft 6 between the bearings 4 and 5 is a hub portion 7 of a work holder-carrying spider 8. As shown best in Figure 8, this spider comprises a housing portion 9 adjacent to one end of which are positioned a series of platforms 10, four being shown, to which are secured with capability of angular adjustment, work-holding heads 11. A pivotal connection for each of these work-holding heads comprises a stud 12 journaled in a portion of the housing 9, each of these studs having an eccentric pivot extension 14 journaled in the casing of the head 11. This eccentric pivot mounting provides an accurate adjusting means for the pivotal center of each of the work-holding heads, the axis of which, as shown, may lie between end faces of the work. A most important reason for this eccentric mounting is that it permits the axes of the heads to be brought the same distance from the axis of the shaft 6, and is valuable even when grinding straight holes, as the radial distance from this axis to the axes of the heads has a direct bearing on the size of the holes ground. The adjacent face of the head 11 is shown in Figure 4 as provided with a series of bearing ribs 15 which ride on the adjacent face of their respective platform 10, and the head 11 is adjustably secured in the desired angular relationship to the axis of the shaft 6 as by means best shown in Figures 4 and 37. Each of the heads 11 is provided with a bearing 16 for a post 17 which is provided between the head 11 and the platform 10 with a head 18. This head is threaded laterally of its axis for engagement with a threaded adjusting rod 19 which is journaled in a plug 20 rockably mounted in a bearing 21 adjacent to the outer edge of each platform 10. A pair of collars 22 arranged on each side of a flattened end of the plug 20 hold the rod 19 against axial motion and its outer end is shown as squared off at 23 for the reception of a tool by which it may be turned. A cap piece 24 secured over the outer face of the rod 19 holds it in position and a washer 25 held on by a cap screw 26 holds the plug 20 against removal from its bearing 21. This mounting provides means for so adjusting each of the work heads as to determine whether or not straight or tapered grinding is to be effected. If the head is adjusted so that the axis of the work is parallel to that of the shaft 6, the work will be ground straight, while any variation from parallelism with the axis 6 will result in taper grinding, the amount by which the axis of the head is out of parallelism determining the angle of the taper.

Journaled within the casing of each head 11 is a work spindle 30, which carries within the casing a work holding member 31 which may be of any suitable description. As shown this work holder 31 is provided with spiral ribs 32 on its outer face bearing on the inner face of the casing so arranged that as the work holder is rotated, these spiral ribs tend to force out from between the casing and the work holder any foreign matter which might otherwise find its way therebetween.

The type of work holder herein shown is intended for gripping the outer face of internal work to be ground, and in Figure 40 it is shown as comprising a plurality of fingers 35 which can be brought toward each other to clamp the work in position by a wedging engagement of their outer ends with an outer shell 36. These fingers 35 are moved axially into or out of work-gripping position, being carried by a hollow plunger 37 which extends axially through the spindle 30, and as shown best in Figure 38, secured to a head 38. This hollow plunger 37 has suitably secured thereto at its rear end, a sleeve 39 having slots 39a in which ride spokes 38a from the head 38 and against the forward end of which bears a heavy coil spring 40 which normally holds the plunger 37 in work-holding position. Back of the head 38 is positioned a piston 41 which carries on its face adjacent to the head 38 a brake ring 42. This piston is mounted in a cylinder 43 secured to the outer end of the casing for the work head 11 and at suitable times fluid under pressure may be admitted back of the piston 41 to force it forwardly against the rear face of the head 38 and thus apply a braking force to the rotation of this plunger 37, and forcing the plunger 37 axially in a direction to release the work. The plunger 37 when in its work-holding position is effectively keyed for rotation with the spindle 30 by its wedging engagement with the forward end of the spindle and the braking effort exerted against the head 38 is therefore effective to stop the rotation of the spindle before the work is released. Rotation of the work spindle itself is produced by rotation of a belt pulley 45 keyed thereto by the key 46. The spindle is mounted in suitable spaced bearings 47 and 48 within the work head casing. The pulleys 45 on the respective work spindles are each driven individually as by a belt 50 (see Figure 2) passing thereover from an individual drive pulley 51. Each drive pulley 51 is connected as through a flexible shaft 52 to a main drive pulley 53 and a belt 54 passes about a plurality of drive pulleys 53 and a pulley 55 of a driving motor 56. It will be noted by reference to Figures 2 and 7 that one of the pulleys 53 is out of engagement with the drive belt 54, so that in this angular position the work spindle is not being rotated, this being at the loading and unloading station in the indexing of the various work holders and of the spider 8, which is accomplished by means hereafter described. The motor 56 is shown as pivotally mounted at 60 to a bracket 61 secured to the side of the machine bed 1. Tension on the belt 54 is produced by a tension spring 62 secured to a lug 63 projecting from the motor support 64 and a safety bar 65 carried by the bracket 61 and passed through a hole 66 in the motor base 64 prevents the motor from swinging violently outwardly should the belt 54 break.

The entire work holding spider is moved axially to bring the work holders simultaneously into or out of operative relation to the grinding wheels by reciprocation of the shaft 6 and for this purpose hydraulic mechanism is herein shown. The shaft 6 at its right hand end, as viewed in Figure 4, is connected to a piston rod 70 secured to a piston 71 (see Figure 4a) riding in a hydraulic cylinder 72.

Means are provided for introducing coolant to the work and fluid under pressure to operate the chuck through the shaft 6. For this purpose the left hand end of the shaft 6 is hollow and positioned therein is a fluid pressure distributing mechanism comprising an inner coolant pipe 75 and four fluid pressure pipes 76 arranged in circular array therearound. Four such pipes are shown for the reason that there are four spindles, but if any other number of spindles should be desired, the number of fluid pressure pipes would be made to correspond. The central pipe 75 extends through a packing gland 77 within which it may be rotated and which couples it with the end of a stationary coolant supply pipe 78. The inner end of the pipe 75 enters into a distributing head 79 from which extend short pipes 80 which are connected as through flexible pipes 81 with central pipes 82 passing axially through the plungers 37 and opening between the work-holding jaws of the several work spindles. The pipes 76 communicate at their outer ends with a head 85 rotatably mounted in a stationary distributing collar 86 which is provided with a pressure supply pipe 87 and a port which communicates with that pipe 76 which leads to the work head in the loading and unloading station only. Each of these pipes 76 communicates through its individual outlet pipe 88 and a flexible pipe 89 with its pressure cylinder 43 back of the piston 41. This fluid pressure is opposed by a coil spring 90, as shown best in Figures 4 and 38.

In Figure 39 a modification is shown in which instead of employing a common motor, such as 56, for driving the various work holders except at the loading and unloading station, an individual motor is employed for each work holder. Such a motor is shown at 91 and is provided with a belt pulley 92 on its armature over which extends a belt to the driving pulley 45 of the individual work spindle, shown generally in this figure of a type similar to that illustrated in Figure 4.

Indexing mechanism

The indexing is produced by step by step rotation of the shaft 6, together with the spider 8 and the work holders carried thereby, and is produced when the shaft 6 with the parts carried thereby is retracted from operative relation to the grinding wheels. For producing this indexing motion the left hand end portion of the shaft 6 has keyed thereto a Geneva wheel 100. This Geneva wheel 100 besides acting as a portion of the indexing mechanism, is provided also with cam mechanisms which control the wheel traverse and the wheel truing, as will later be described more specifically under these respective headings. As shown best in Figure 2, this Geneva wheel 100 is provided with slots 101, one for each of the work spindles, with which cooperates an indexing arm 102 having a roller 103 journaled at its outer end for engagement in the slots 101. This arm 102 is journaled on a stub shaft 104 and has secured to or integral therewith a gear segment 105 with which meshes a rack bar 106 forming the piston rod of a hydraulic cylinder 107. On reciprocation of this rack bar 106 from the full to the dotted line position shown in Figure 2, the arm 102 is swung through an arc sufficient to move the Geneva wheel 100 through the desired angular distance necessary to index the turret from one to the succeeding angular position to change the work holders from one to a succeeding station. It will be seen that the Geneva wheel 100 is out of axial position to be engaged by the arm 102 when the work spindles are in their relative operative positions, the work spindles then being in the full line position shown in Figure 4, the indexing occurring when the shaft 6 has been moved axially into the dotted line position shown in Figure 4. When the arm 102 has reached its dotted line position shown in Figure 2 to complete the indexing motion, it strikes upon a lever 108 (see Figure 2), and the depression of this lever actuates a flexible release cable 109, the inner end of which is operatively related to a valve mechanism which admits fluid under pressure to the left hand side of the piston 71, shown in Figure 4a, and returns the shaft 6 axially to the normal operative position of the work holders. Details of this valve mechanism will be taken up under a discussion of the hydraulic system.

Means provided for locking the spider 8 in any of its indexed positions with extreme accuracy is shown best in Figures 8, 9 and 10. It will be noted that the spider 8 is provided with four locking and guide projections 115, provided on each side with hardened wear plates 116. The machine base 1 is provided with a cross frame portion 117 which is provided with a cut-out portion 118 between which one of the projections 115 is positioned in any indexed angular position of the spider and when the spider is axially in operative position. When the spider is retracted for indexing, these projections 115 are drawn laterally out of the plane of the cross frame member 117, so that the spider is free to be indexed. One side of the cut out portion 118 has positioned therein a locating face member 119 which is formed as the outer face of a headed pin 120, and one of the wear pieces 116 of each of the extensions 115 when brought up firmly against this surface insures the correct angular position of the spider 8 after each indexed position. Opposite to this surface member 119 is positioned an abutment rod 125 having a head 126 which may engage with the opposite wear piece 116 and push upon this wear piece to press the other one against the locating surface member 119. This abutment rod 125 is slidably mounted in the frame portion 117 and has fixed to its outer end a piston 130 against the outer face of which fluid under pressure may be admitted, as through a port 131 in a cap 132, which closes off the outer end of the cylinder 133 within which the piston member 130 is slidable. The direction of drive of the belt 54 by which the work spindles are rotated is such as to tend to hold the extensions 115 against the inner face of the abutment rod 125 and away from close contact with the locating abutment face member 119, but when the spider has fully entered between these two abutment members, fluid under pressure being admitted behind the piston 130, forces one of the extensions 115 into close contact with the locating face. This construction insures minimum wear on the locating face 119, since during the axial motion of the spider this spider bears against the movable abutment rod 125 and is only brought up against the accurate locating face 119 when its axial motion has stopped. The wear of rubbing contact is thus entirely on the opposite wear plate 116 and on the movable abutment member 125. The indexing position of these parts is shown in Figure 10, while the locked position is shown in Figure 9.

Grinding wheel mounting and traversing mechanism

The standard 3 at the right hand end of the machine, as viewed in Figure 4, is extended above the bearing 5 to form a housing indicated generally at 150, and within this housing and arranged about the axis of the shaft 6, are a plurality of grinding wheel carrying units, there being one less unit than there are work spindles so that there is no unit at the loading and unloading station of the work holders. Since as herein illustrated, there are four rotary work supports, there are three grinding wheels. Each of these units, as shown best in Figure 23, comprises a pair of alined tubular portions 155 and 156 connected intermediately by an enlarged casing portion 157. The tubular portions 155 and 156 are journaled in tapered bushings 158 and 159 carried in bearing sleeves 160 and 161 secured in opposed relation in opposite walls of the casing member 150, so that the axes of the sleeve portions 155 and 156 are arranged parallel to the axis of the shaft 6. These sleeve portions 155 and 156 are mounted for axial as well as rocking motion in their respective bushings and in order to take up wear, the bushings are shown as split, the split ends having their opposed faces tapered, as shown at 165 in Figure 23a, for cooperation with mating tapered faces of an adjusting piece 166. This piece 166 has threaded engagement with adjusting screws 167 and 168 mounted in the bearing sleeves 160 and 161 so that the adjusting pieces 166 can be forced outwardly, extending the bushing to permit the desired rocking and axial motion of the sleeve 155 and 156, and the bushings are also capable of axial adjustment as by the adjusting screws 168a.

In each of the sleeves 156 is journaled a grinding wheel drive shaft 170 carrying on its outer end beyond the sleeve 156 a driving pulley 171 which may be belted to pulleys 172 on an armature shaft 173 of a driving motor 174. The various pulleys 171 are set at varying distances from the outer wall of the casing 150 in order that the driving belts may not interfere with each other, as shown in Figures 1 and 3. The opposite end of each shaft 170 within the enlarged portion 157 carries a belt pulley 175 over which a belt 176 passes. This belt 176 passes around a spring idler pulley 177 by which it may be held under proper tension and about a pulley 178 on the grinding wheel shaft 179. To the opposite end of this shaft 179 is secured the grinding wheel 180 which constitutes the operative tool of the machine. This shaft 179 is carried in suitable bearings (not shown) in a unit shaft housing 181 which may be of standard construction.

The several grinding wheels are arranged to be traversed independently of each other. To this end, each of the sleeves 156 has fixed thereon, as by a nut 185, a circular rack 186 and engaging the teeth of this rack are teeth on a sector 187 secured to a rock shaft 188 (see Figures 23 and 24). This rock shaft 188 is journaled within a bracket 189 and on the opposite side of this bracket from the segment 187 it carries a crank arm 190. To a crank pin 191 at the free end of this crank arm is pivoted one end of a link 192. The opposite end of this link carries a second stud 193 having a squared head 194 riding in a slot 195 of an arm 196 secured to a rock shaft 197. This rock shaft is journaled in a portion of the same bracket 189 and has pinion teeth 198 cut therein with which mesh the teeth of a rack bar 199. This rack bar 199 forms an intermediate portion of a double acting piston mounted in a fluid pressure cylinder 200. By admitting fluid under pressure to opposite sides of this piston, the rack bar is driven in one or the other direction as to turn the sector 187 and reciprocate the tool head in its bearings on the sleeves 155 and 156. It will be noted that the grinding wheels 180 are eccentrically disposed to the rocking centers of their respective carrying units and hence it is necessary to accurately determine the angular relation of the wheel units in order to insure the proper position of the grinding wheel with relation to the work and change of this relation is also availed of to accomplish the feeding motion of the wheel with relation to the work. This angular position of each of the wheel units, as shown, is controlled by the engagement of an adjustable portion thereof on a controlling contour or abutment member. As shown this contour or abutment member comprises a sleeve 210 which surrounds the shaft 6 (Figure 4). In order that it may be adjusted to take up wear between the parts, it is shown as carried at one end on a tapered portion 211 of the shaft 6, its inner surface being correspondingly tapered and at its other end it is carried on a conical sleeve 212 which may be provided with suitable means for adjusting it axially in order to take up wear and to properly center the sleeve 210. It is also angularly adjustable to present different surfaces for engagement by controlled parts as will later appear.

Each of the wheel units carries a shoe 215 which bears against the outer face of this sleeve 210 and as the wheel units are reciprocated as just described to effect traverse motions between the wheel and the work, these shoes slide in contact with the sleeve 210 lengthwise. The uppermost wheel unit, as shown in Figure 14, is so disposed that its weight holds its shoe 215 into contact with the outer face of the sleeve 210, but the lower wheel units as shown are so disposed that they must be held up against this sleeve, as by one or more springs 216. Aside from these springs, the two lower units differ from each other only in reversal of certain parts with relation to each other. The right hand lower unit and the upper unit are identical.

The general arrangement of the parts is best shown in Figures 18 to 22. Referring first to Figure 18, it will be noted that each of the shoes 215 is carried within a slot 220 in an arm 221. It is mounted with capability of rocking within this slot, being supported on an eccentric portion 222 of a pivot pin 223 threaded at its inner end as at 224 in a socket within the arm 221. Its opposite end is provided with a slot 225 by which the pin may be turned to adjust the amount by which the shoe projects from the outer face of the arm 221. The outer face of the shoe is shown as convex laterally and straight longitudinally to bear over an extended length along the surface of the sleeve 210. The arm 221 is shown as pivoted at one end at 227 on a bar 228. This bar 228 is axially adjustable for a purpose which will later appear, but in so far as the normal wheel feed is concerned, the pivot 227 may be regarded as the fulcrum of the arm 221 carried in a bracket 230 secured in any suitable manner to the housing 157. Near the opposite end of the arm 221 it has set thereinto a hardened wear piece 235 which is formed as the head of a plug 236 removably seated in a hole 237 through the arm 221. Against this wear piece engages the outer face of an eccentric 238 formed on a rock shaft 239 (see Figure 19). This rock shaft has keyed thereto a pinion 240 which meshes with a rack bar 241 on a piston rod 242. This piston rod has secured thereto a piston 243 riding within a fluid pressure cylinder 244. The piston 243 is normally held at its inner limit of motion as by a spring 245 surrounding the rod 242 and reacting between a collar 246 secured thereto and a sealing member 247 which acts as a packing for the rod 242 adjacent to the piston 243. By introducing fluid pressure back of the piston 243, as through the port 248, the piston may be driven to the right as viewed in Figure 18 thus moving the rack bar 241 and rotating the eccentric 238 which acts to rock the arm 221 outwardly. This acts to move the wheel head away from the axis of the shaft 6 and produces a feed of the grinding wheel into the work. This feed, it will be noted, is substantially radial to the axis of the shaft 6 and thus substantially perpendicular to the direction of indexing motion of the work head as previously described, so that any inaccuracy in exact setting of the work head will have minimum effect in relation to the feed of the wheel relative to the work.

Provision is also made for effecting a feed of the wheel to provide for the decrease in size of the wheel due to wear and truing and this additional feed is effected by moving the fulcrum 227 of the arm 221. Thus the arm 221 is in effect floatingly supported, being movable both at its free end and at its fulcrum end and controlled by different mechanisms. The means for producing the feed to compensate for wheel wear and truing is effective on the bar 228. This bar is provided with a threaded portion at 250 with which engages an internally threaded portion of a sleeve 251. Keyed to this sleeve 251 is a worm wheel 252 which is held against axial motion so that through its rotation the bar 228 is moved axially. Meshing with the worm wheel 252, as shown best in Figure 21, is a worm 255 having a shaft 256. This shaft at one end has fixed thereto a gear 257 having relatively fine teeth which may be ratcheted around in order to rotate the shaft 256 and adjust the bar 228 axially. The shaft 256 is journaled in a pair of alined bushings 260 and 261 which extend beyond their supporting frame at both ends and on these extended ends are journaled the opposite arms 262 and 263 of a yoke 264. On one end of this yoke 264 is secured an arcuate arm 265 and to this arm is pivoted, as at 266, an arm 267 which carries at its outer end a spring ratchet 268. By rocking the arm 267 about its own axis 266 toward the axis of the gear 257 and also at the same time swinging the yoke 264, the spring pawl 268, engaging between the teeth of the gear 257, causes this gear to be rotated step by step in the direction of the arrow shown in Figure 20. This rocking of the arm 267 to bring the pawl into engagement between the teeth of the gear and also to rock the yoke 264 is produced by mechanism including a link 270 having ball ends, one end of which engages in a socket 271 in the arm 267, and the other end in a socket 272 in one end of an arm 273 shown best in Figure 21. This arm 273, as shown best in Figure 22 is secured to a rock shaft 274, and it is not only urged outwardly to lift the ratchet 268 out of contact with the gear 257 but also to hold the portion 264 against an adjustable stop screw 275, by a torsion coil spring 276. This spring surrounds a bearing boss 277 and at one end hooks over a pin 278 on the arm 273 and its other end is secured as by the screw 279 to the boss 277. This shaft 274 extends through the bracket 230 and at its opposite end has secured thereto a finger 280 (see particularly Figures 4, 22 and 23). It should be understood that there is one of these arms 280 for each of the grinding wheel units and each lies in the path of motion of an actuating lug 281 carried by a circular portion 282 of a spider 283. This spider 283 passes along between two of the grinding wheel units, as shown best in Figures 4 and 14, and terminates at its other end in a portion 284 rockably mounted on the inner end portion of the sleeve 210. As will later appear, this portion 284 carries the truing diamonds for the several tools and is rocked to bring these tools into and out of truing relation to the grinding wheels and to bring the lugs 281 into proper angular position to coact with the arms 280. During the last 15° of indexing motion, the lugs 281, which are then opposite to the arms 280, are rocked into contact with and rock these arms to effect a ratcheting of the compensating feed mechanism as previously described, this being done by rocking the shaft 274 to bring the arm 273 inwardly, engaging the ratchet 268, and turning the arm 264 away from the stop 275. By adjusting the initial position of the stop 275, the amount of this ratcheting can be adjusted as described, and when so adjusted the position of the stop 275 may be fixed by tightening a screw 285 engaging the split portion 286 of the bracket 287 through which the stop screw 275 is threaded. The member 284 is provided with an outwardly extended annular flange 290 which houses one end portion of an accordion pleated guard member or boot 291 which engages at its other end against a plate 292 secured to the inner face of the housing 150, preferably engaging beneath an annular retainer 293 thereon, as shown best in Figure 5. This acts to shield the bearing parts to the right of the plate 292 from access by foreign particles from the grinding operation. Acting in conjunction with this member 291 are other guard elements about each wheel unit as shown at 295. The guard 291 insures sealing of the parts throughout the range of relative axial motions of the work-holding mechanism and the grinding wheel units. It will be noted that the length of travel of the wheel units is fixed and definite, which is of importance where it is desired to grind to shoulders or in blind holes. It is also an important advantage of this machine that the positions of the wheels are accurately gaged by the outer face of the sleeve 210 with which the shoes 215 engage and in order to insure high accuracy the sleeve 210 may be adjusted angularly from time to time to bring fresh surface portions into operative engagement with the shoes 215.

Wheel truing mechanism

The truing mechanism is carried by the rocking spider 283 hereinbefore mentioned in connection with the compensating wheel feed mechanism. Adjacent to each of the wheel units this spider 283 is extended, as at 300 (see Figure 15), and each of these extensions is provided with an opening 301 therethrough. One portion of this opening 301 is substantially circular in outline, but it is provided with a lateral extension 302 which is of a width less than the full diameter of the circular portion. Extending into this extension 302 of the opening are the truing devices or diamonds at 303, and on rocking of the spider 283 these diamonds may be brought from the full line inoperative position, shown in Figure 15 to the dotted line position in operative alinement with the grinding wheels so that as the shaft 6 is moved toward operative grinding position, the truing devices are brought across and true the grinding faces of the wheels.

The spider is normally held in its inoperative angular position, as by a spring 305 which engages at one end a hook 306 secured to a portion of the spider 283 and is fixed to a fixed part of the frame at the other end. This hook 306 is shown as secured to one arm of a forked portion 307 of the spider, this forked portion being formed by a slot 308 extending inwardly from one edge and within which is rockably mounted a tripping finger 309. As shown in Figure 17, one end of this tripping finger extends through an opening 310 in the spider in position to be contacted at certain times by the head 311 of a stud 312 secured to a portion of the housing 9 within which the work-holding heads are pivotally mounted. This finger 309 is normally held in the position of Figure 17 with its end projecting through the opening 310, as by a leaf spring 312. When in this position, as shown in Figure 17, the lug 311 contacting with the side face of the finger 309, causes the rockable housing 284 to be turned about the axis of the shaft 6 with the housing 9 as the work holders are indexed throughout the final fifteen degrees of the indexing motion. This rocks the spider 283 to the dotted line position shown in Figure 15 where the diamond truing devices are in operative relation to the grinding wheels. As the shaft 6, with the parts carried thereby, is moved axially toward operative relation to the grinding wheels, and has passed the wheels so that truing has been effected, the end 315 of the arm 309 impinges upon a stud 316 secured to the plate 292 so that further axial motion of the shaft 6 rocks the finger 309 into the position shown in Figure 16, releasing the finger 309 from the stud 311, and permitting the spider 283 to be rocked back to its inoperative position, as shown in full lines in Figure 15, where the diamonds are out of axial alinement with the surface to be trued.

It will be noted that each of the diamonds is independently adjustable in its mounting in the spider 283 so that the wheels can be trued to sizes independent of each other, thus to provide for successive grinding operations in the three stations where grinding wheels are positioned to determine, independently, the amount of stock to be removed by each wheel. It will be noted that the outer wall of the opening 302 is formed by a spring arm 320 integral with the spider 283 at one end. The free end of this spring arm may be clamped to an oppositely disposed portion 321 as by a clamping bolt 323, a felt piece being placed between the parts at 324 to keep out dirt and dust while permitting adjustment. This provides an additional means of close final adjustment of the truing diamonds 303.

Work spindle loading and unloading mechanism

Referring first to Figures 2 and 7, it will be noted that the loading and unloading position or station is the upper station at one side of the machine, this being the station wherein the driving pulley 53 for that particular work spindle is out of contact with the driving belt 54. Mechanism is provided in accordance with this invention for automatically removing ground work from this station and supplying thereto a new piece to be ground, between the indexing actions of the machine. This work loading and unloading mechanism is shown more specifically in Figures 40 to 46. A bracket 350 is secured to the top portion of the casing part 150 and carries a hydraulic cylinder 351. Within this cylinder is reciprocable a double acting piston 352, an intermediate portion of which is provided with rack teeth as at 353 which mesh with a gear 354. This gear 354 is mounted on a rock shaft 355 which is provided at one end with an arm 356. Pivoted to the outer end of this arm, as at 357, is one end of a link 358, the other end of which is pivotally secured as at 359 to a rack bar 360. This rack bar is slidable in a guide bracket 361 and meshes with a pinion 362 mounted on a rock shaft 363. Secured to this rock shaft is a loading and unloading arm 364. The end of this arm carries a work-engaging device, as 365, shown in detail in Figure 45. It comprises a block 366 provided with a shank 367 which is pressed into an opening in the end portion of the arm 364, this end portion being offset as at 368 for a purpose which will later appear. To the block 366 is secured in opposed relation, spring fingers 369 having their ends bent to form projecting work-retaining ribs 370. These spring fingers may be thrust into the opening in the work piece W and will spring outwardly to hold the work piece thereon, the fingers being so shaped that they can be engaged either in ground work or work to be ground, so that they may be employed not only to remove the finished work from the spindle at the loading position, but also to engage work to be ground and inserted into proper position in the work-holding mechanism of the spindle. A shoulder portion 375 on the block 366 limits the extent to which the fingers 369 may be projected through the work. The work pieces to be ground are supported in a chute 376 (see Figures 40 and 42) which is partly closed off on one face by marginal strips 377 and 378 so that the work pieces are kept in a single line. The lower end of the chute is turned downwardly and inwardly, as shown at 379, and terminates with a rounded shoulder 380 which prevents the work pieces from dropping out lengthwise. They are removed sidewise from the lower end of the chute by the block 366. They are yieldingly held from accidental removal, as by a pair of spring pressed fingers 381 positioned diametrically opposite to each other, these spring fingers being shown best in Figure 44. Each has an inwardly directed hooked end 382 which partly closes off the opening 383, in which the work pieces are positioned, and has an arm 384 pressed to hold the hooked ends in obstructing position by the spring 385. This spring reacts between a portion 386 of the chute and an adjusting plug 387 threaded through the end portion 384.

Means are provided by which when one work piece is removed from the lower end of the chute the next is prevented from feeding down until the loading arm is properly positioned to receive it. This mechanism comprises a pair of stop pins 390 and 391, which are so spaced, as shown in Figure 42, as to permit but a single work piece to lie therebetween. These pins 390 and 391 have headed outer extremities, as 392 and 393, provided with cross pins 394 and 395 (Figure 43). These pins are engaged in slots 396 and 397 in opposite ends of a lever 398 fulcrumed at 399 to a fixed part 400 extending from the rear face of the chute 376. This lever 398 is provided with an extension arm 401 which is in position to be engaged back of the offset portion 368 of the loading arm 364, so that as the loading arm is swung up from the full line position, as shown in Figure 40, to the uppermost dotted line position, it contacts with the extension 401 and rocks the lever 398 to force inwardly the pin 390 against the action of a spring 402 to interpose a stop between the two pieces of work at the bend in the lower end of the raceway and to withdraw the stop pin 391 so as to permit the work piece shown between the pins 390 and 391 in Figure 42 to drop below the pin 391 into loading position, as shown in Figure 40. Consequently swinging of the loading arm 364 in clockwise direction from the upper dotted line position causes its spring fingers 370 to engage this piece of work, and further swinging of the loading arm 364 in the same direction causes this work piece to be moved out of the raceway past the spring finger ends 382 and finally delivers it into the full line position in Figure 40 between the clamping jaws 35 of the work-holding mechanism of that spindle which is in loading position at that time. The jaws are then closed upon the work by the motion of the clamping plunger 37. The loading arm 364 is swung back to the lower dotted line inoperative position, by continued counterclockwise rotation of the gear 354 moving the arm 356 beyond its dead center position and causing reversal of the motion of the rack bar 360 and consequent withdrawal of the loading arm, and there remains until after the next indexing of the work holders which brings a finished piece of work into the unloading and loading station. The arm 364 is then again moved into the full line position shown in Figure 40 to engage the finished piece of work, after which the jaws 35 release the work and it is carried back by a swing of the loading arm 364 in counterclockwise direction to the upper dotted line position shown in this figure, all by rotation in clockwise direction of the arm 356 which first moves to dead center position and then away therefrom, imparting first clockwise and then counterclockwise motion to the arm 364. As the work piece passes back into the chute 376, the back face of the work piece impinges upon the front faces of the hooked extremities 382 of the fingers 381 which cannot yield in that direction to permit it to pass. Consequently further retraction of the loading arm 364 causes the spring fingers 370 to be pulled out from the work, thus releasing it so that it may drop into the lower chute 405 (Figures 42 and 43) from which it may be conducted to any suitable point. This movement of the loading arm 364 to release the finished work has caused the rocking of the lever 398 so that an unground piece is released by the pin 391 to descend into position to be taken on the next clockwise swing of the loading arm 364. The motions of this loading and unloading arm are controlled by reciprocation of the piston 352 under the control of valve mechanism which will later be described.

*Hydraulic drive and control mechanism*

The operations of the various mechanisms are controlled through hydraulic valves which are actuated in timed relation to each other to perform the desired cycle of operations by power. This power is derived from the motor 450 having a drive pulley 451 on its armature shaft. A belt passing about the pulley 451 also passes around a driven pulley 452 (see particularly Figure 11) which is journaled on a shaft 453, as shown, through suitable roller bearings at 454. To the hub 455 of this pulley is secured a ring 456 having a clutch face at 457. This ring 456 may be secured as by a series of screws 458 which pass through the hub 455 and are threaded into a retaining ring 459 on the other face of the hub. Cooperating with the clutch face 457 is a mating clutch face 460 on a ring 461 which is pinned to a collar 462 keyed to the shaft 453. A nut 465 threaded on the end of the shaft 453 holds the parts in position. The pulley 452 is permitted axial as well as rotary motion relative to the shaft 453 so that its clutch face 457 may be brought into or out of clutching relation to the clutch face 460 of the ring 461. Thus the pulley 452 may be clutched to or released from the shaft 453. This motion of the pulley 452 is controlled by a shifter yoke 470 which engages on opposite faces of the pulley and is secured to an axially movable bar 471 to the opposite end of which is secured a piston 472 riding in a hydraulic cylinder 473. The end of the bar 471 is extended through the piston 472 and is adapted to impinge on an adjustable stop screw 474 threaded through the end cap 475 of the cylinder 473 thus to limit the axial motion of the bar 471 in one direction. Thus it will be seen that hydraulic means is provided for clutching and unclutching the driven pulley 452 to its shaft 453. A cam shaft 480 is driven by the shaft 453 at a slow rate through reduction gearing. This gearing comprises a planetary reduction mechanism driven directly from the shaft 453 and another chain of gearing which will later be described.

The planetary gearing comprises an eccentric enlarged portion 481 of the shaft 453 to which is pinned opposite arms of a U shaped yoke 482 so that as the shaft 453 is revolved, this yoke is revolved with it. Between the sides of the yoke there is rotatably mounted on the shaft 481 an external gear 483, this gear being given a bodily rotation about the axis of the main portion of the shaft 453 as this shaft is rotated the yoke 482 counterbalancing this gear. It meshes with a pair of internal gears 484 and 485. The gear 484 is stationary, being formed as part of the housing 486 within which the yoke 482 and the internal gear 483 is mounted. The other gear 485 is journaled for rotation within the stationary casing 487 and concentric with the shaft 453 as by the ball bearings 488, and it also has a bearing 489 within which the adjacent end of the shaft 453 is journaled. The stationary and rotatable gears 484 and 485 are of nearly the same size, the gear 485 having, say, one tooth more than the gear 484 and since the gear 484 is stationary and the gear 483 is rolled about in contact therewith as the eccentric portion 481 of the shaft 43 is rotated, rotation of the gear 483 is produced. This gear 483, in turn, meshing with the rotatable gear 485 causes a slow rotation of this gear. The journaled portion 490 of the gear 485 constitutes a driving shaft to which is keyed a pinion 491 which meshes with a gear 492 secured to the cam shaft 480. This driving connection between the pinion 491 and the relatively large gear 492 acts as a further reduction gearing and by the use of change gears the rate of rotation of the cam 480 may be adjusted.

As shown in Figure 1, the cam shaft 480 carries thereon five cams 500, 501, 502, 503 and 504. Each of these cams may be angularly adjustably fixed to the shaft 480 in the manner shown best in Figures 11 and 12. Referring to these figures, at 505 is shown a collar fixed as by a set screw 506 to the cam shaft 480. The cam which may be formed in two segmental pieces 507 and 508 may be provided with an annular recess in one face into which the collar 505 may project and screws 509 may be passed through arcuate slots 510 in the cam sections 507 and 508 and threaded into holes in one end face of the collar 505. Thus the two cam sections may be assembled together and secured against rotation to the collar 505 and they can be removed and replaced by others in order to change the machine cycle as desired without disassembling the shaft 480. Beneath the cams 500, 501, 502, 503 and 504 are arranged the control valves 515, 516, 517, 518 and 519. Valves 516, 517 and 519 are identical and are shown diagrammatically in two different positions in Figures 33 and 34. Valve 515 is shown diagrammatically in Figures 30, 31 and 32 in three different positions. Valve 518 is shown in Figures 35 and 36 in two positions. Valve 515 controls the wheel feeds. Valve 516 controls the reciprocations of the shaft 6. Valve 517 controls the locking of the work holders in indexed positions. Valve 518 controls the traverse motions of the wheels, and valve 519 controls the work-loading mechanism. All these valves are secured to the forward face of a header 520, which, in turn, is secured to an upright wall member 521. This header includes a fluid pressure supply passage 522 and the two discharge passages 523 and 524. The supply passage 522 is supplied by fluid under pressure from a pressure pump 525 driven by the motor 450 as through the belt connection 526. As shown in Figure 47 the discharge passages 523 and 524 return to the reservoir 527 from which the pump 525 draws its supply, the system being maintained under pressure, the exhaust lines having therein a pressure relief valve 530 and the supply line having a pressure relief valve 531.

As shown in Figure 27, the cam 500 is provided with a single notch 540 and it cooperates with a lever arm 541 fulcrumed at 542 on a fixed bracket 543. It is provided with an upstanding finger 544 which may be lifted into the notch 540 when the cam 500 is in proper angular position to permit such action. This lever 541 also has journaled therein a roller 545 which impinges on the upper end of the valve 515. At this end the arm 541 is pivoted to an upstanding arm 555 and the upper end of this arm 555 is pivoted to one arm 547 of a lever 548, mounted on a fixed fulcrum 549. To the other arm 550 of this lever is pivoted a rod 551, which, as shown in Figures 1 and 1a, is pivoted at its upper end to one arm of a bell crank lever 552, the other arm of which has a roller 553 which may be engaged by a flanged rim 554 on the Geneva wheel 100. When the shaft 6 moves axially to bring the parts to indexing position, the cam follower roll 553 is contacted by the rim 554 which results in rocking of the bell crank lever 552 and pulling upwardly on the rod 551 and depressing the arm 547 and bringing the roll 545 down against the valve 515 to move it into its lowest position shown in Figure 30. In this position the fluid under pressure passes from the pressure passage 522 through the ports 560, 561 and 562 around the valve, and out through the passage 563, 564 and 565. The bell crank lever 552 when moved into this position is held by a latch 566 (Figure 1a) engaging beneath a lug 567 on the bell crank lever 552. This latch 566 is normally urged into latching position by a spring 568 and has a roller 569 which may be contacted by the opposite face of the rim 554, so that when the shaft 6 moves toward operative position, it is rocked out of latching position, releasing the bell crank lever 552 which releases the valve 515. This valve is then raised to its highest position by the spring 570 which is seated in a socket within the valve and bears at its lower end against the valve casing 571, the lug 544 then being opposite to the notch 540. This raised position is shown in Figure 32 in which the ports 560, 561 and 562 are blocked off by the valve, while the passages 563, 564 and 565 are open to discharge around the valve into the passages 523 and 524.

There is also an intermediate position of the valve 515, this intermediate position being controlled by the cam 500, the lug 544 then riding on its edge. In this position of the valve, shown in Figure 31, all the ports are blocked off by the valve.

Valve 516 is controlled partly by the cam 501. Referring to Figures 25 and 26, the valve 516 may be engaged by a roller 576 carried by a lever 577. The outer end of this lever is formed with an arcuate slot 578 within which rides a cross pin 579 carried by a yoke 580. To this yoke is secured a rod 581 which forms the core member of the flexible cable 109 so that when the indexing arm 102 strikes the lever 108, hereinbefore described under the heading "Indexing mechanism," the core 581 is pulled, which results in lifting the outer end of the lever 577. This results in lowering of the roller 576 and the depression of the valve 516, and the parts may be held in this position by a pivoted latch 5780 having a latch lug 5790 which snaps over the end portion 5800 of the lever 577. This latch 5780 is normally urged toward latching position by a spring 5810 seated in a socket therein and reacting against a pin 582 which presses against a face 583 of a bracket 584 extending upwardly from the casing of the valve 516. This latch is provided with an adjustable abutment screw 585 which is in the plane of a cam 586 so shaped that as the cam shaft 480 rotates after the lever 577 has been latched in position, it releases this latch. This permits a follower lug 590 on the lever 577 to impinge upon the large diameter portion 591 of the cam 501 and against which it may ride until it is released by the presentation of a notch 592 in the periphery of the cam 501 which permits the raising of the valve 516 and the tilting of the lever 577 into the dotted line position shown in Figure 25. It will be noted that while the follower lug 590 is riding on the cam portion 591, the portion 5800 of the lever 577 is too high to be engaged by the latch 5780. This valve 516 is illustrated in its two positions in Figures 33 and 34. The valve is normally held lifted in the position shown in Figure 34 by a spring 593 which extends within a socket in the valve and bears against the head 594 of the valve casing. In the lifted position of the valve shown in Figure 34, fluid pressure passes from the supply passage 522 around the valve and out through the passage 600 and fluid under pressure may discharge through the passage 601 around and beneath the valve and out to the discharge passage 524. In the lowered position of the valve 575 the fluid under pressure may pass from the supply passage 522 around the valve and out through passage 601 and may discharge through the passage 600 around the valve and to the discharge passage 523. The pressure and discharge connections are thus reverse in the two positions.

Valve 517 is actuated entirely by cam 502, as shown in Figure 28. This valve is identical in construction with valve 516 and consequently has two positions for its valve stem. The cam 502 has a circular outline for the major portion of its length but is provided with a short notch therein as at 605. Ridable on the periphery of this cam 502 is a follower lug 606 on a lever 607. This lever 607 is fulcrumed at 608 to a bracket 609 secured to the header 520 and carries at its free end a roller 610 which engages the upper end of the valve 517. As in the case of the valve 516, the valve may take two positions, in one of which one of the outlet passages is connected to fluid under pressure, and the other to discharge, the movement of the valve to its opposite position reversing these connections.

The valve 518 is controlled by the cam 503, this cam 503 controlling the positions of the valve identical with the control of the valve 517, with the exception that the stroke of the valve is slightly less. This valve is shown in Figures 35 and 36 in its two positions and it controls entirely the discharge of fluid pressure, being out of connection with the pressure supply passage 522, and its only connection at any time is with the discharge passage 523. This is in the upper position of the valve as shown in Figure 36. This valve has six ports 620, 621, 622, 623, 624 and 625. In the valve position of Figure 35, the passages 620 and 621 are in communication, passages 622 and 623 are in communication and the passages 624 and 625 are in communication. In the upper position of the valve the passages 620, 622 and 624 are connected around the valve to the discharge passage 523, and the passages 621, 623 and 625 are blocked off. Here again, the valve is normally held in its uppermost position, as by a spring 626.

The valve 519 is identical with valves 516 and 517 and is entirely controlled by the cam 504 and is identical with the construction shown in Figure 28 for the cam 502 and the valve 517.

Operation

Certain mechanisms not heretofore described may be more clearly understood by following through a cycle of operations of the machine. The cycle starts with the shaft 6 in its right hand or grinding position and the driving pulley 452 in clutched position so that the cam shaft 480 is in position to be driven, the pulley 452 having been thrown into this condition by fluid pressure applied back of the piston 472 near the close of the previous cycle. The motors 56, 174 and 450 are then started, the motor 56 rotating the work spindles, the motor 174 rotating the grinding wheels, and the motor 450 operating the pressure pump and the cam shaft. The first action of the cam shaft as it rotates is to cause the cam 502 acting on the lug 606 of the lever 607 to depress the valve 517, this valve being identical with that of Figure 33, in which condition fluid under pressure passes from the pressure passage of the header and through the pipe 650 to the spider-locking cylinder back of the piston 130 through the port 131, thus locking the spider which carries the work spindles in accurately indexed position. The upper port of this valve corresponding to the port 600 in Figure 33 is idle in this valve and is unconnected with any other portion of the machine. The work spindles are now held firmly in position for the work pieces to be operated upon by the grinding wheels.

The next action is to start the traverses of the several grinding wheels, and this is effected through valve 518. This action is produced by the rotation of the cam 503 which is identical with the cam 502 shown in Figure 28, and acts to depress the valve 518 into the position shown in Figure 35 where the ports 620 and 621, 622 and 623, 624 and 625, respectively, are connected together. In this position of the valve, fluid under pressure is directed from the main pressure line 651 and passes through the pipe 652 to the three reversing valves 653 (Figures 29, 29a and 47), there being one such reversing valve for each of the traversing fluid pressure pistons 199. Each of these pipes 652 has two connections to each reversing valve, as shown best in Figures 29 and 29a, one of these being at the port 654, and the other being at the port 655. Each reversing valve comprises a reciprocating valve member 656 having heads 657 and 658 at opposite ends and an intermediate head 659. A fluid discharge pipe 660 connects with this valve through the single port 661. The reversing valve is connected to opposite ends of the cylinder 200 by the pipes 663 and 664 through the ports 665 and 666, respectively. In the position shown in Figure 29, fluid under pressure enters between the heads 657 and 659 of the valve, through the port 654, and passes out through the port 665 and the pipe 663 to the left hand end of the cylinder 200. From this left hand end it also passes through the pipe 667 to the port 621 of the valve 518, and is connected back through the port 620 of this valve through the pipe 668 to the left hand end of the reversing valve 656, which drives the reversing valve to its opposite limit of motion shown in Figure 29a. This acts to reverse the connections to the cylinder 200, opening the pressure line 652 through the port 655 between the piston heads 658 and 659, out through the pipe 664, to the right hand end of the cylinder 200. After the piston 199 has been moved over to the left, as shown in Figure 29a, it opens a connection through the pipe 669 to the right hand end of the reversing valve, whereupon this reversing valve is thrown back to the left to the position shown in Figure 29, repeating the cycle of operations so as to drive the piston 199 to its first position. This piston 199, as previously described, is connected to reciprocate one of the grinding wheels. The speed with which this traversing is produced is individually determined for each wheel by the adjustment of a throttle valve 670 in each of the discharge lines 660 from the several reversing valves which leads back through the discharge pressure valve 530 to the supply tank. This traversing action takes place as long as the valve 518 is held in its depressed position and when terminated leaves all of the wheels at the same end of their traverses. This positioning of the wheels is accomplished through the lifting of the valve 518 to the position of Figure 36, by cutting off the supply of fluid under pressure from lines 667 to lines 668 and opening the lines 668 to discharge, causing the reversing valves to remain in their left hand positions.

The wheel feeds are started by the depression of the valve 515 into the intermediate position shown in Figure 31, in which all of the ports are blanked. This position is produced by the rotation of the cam 500 and persists as long as the projection 544 rides on the concentric surface of this cam. In this position of the valve 515, pressure from the pressure line 651 is allowed to pass throttle valves 675 and into the feed cylinders 244 for the several grinding wheels, thus to feed them independently of each other and at a rate determined by the setting of their respective throttle valves throughout the limits of feed as determined by the throw of the feeding eccentrics 238. It will be noted that these eccentrics are of fixed eccentricity so that there is no possibility of overthrow or any variation in feed in successive actions of the feed mechanism. This is of advantage in that the feed comes to a definite limit of travel for sizing or duplicating. The wheels are now traversing the work and are gradually being fed to their respective feed limits and the wheel traverses continued for a "sparking out" period. While this grinding action is going on, the loading arm is being actuated to remove the finished work from the loading and unloading station, and to insert a new piece of the work in the spindle at this station. This is produced by the action of the valve 519 controlled by the cam 504. As the cam 504 reaches the position shown in Figure 7, permitting the valve 519 to lift, this valve moves into the position shown in Figure 34 where pressure from the header passes through the valve and through the pipe 680 to the left hand end of the cylinder 351. This drives the piston 352 to the right, rotating the gear 354 in counterclockwise direction. The first portion of this rotation moves the pivot 357 from the full line position to the dotted line position shown in Figure 40, this moving the rack bar 360 to the right slightly, since the pivot 357 was below its dead center position at the start of this action. This moves the loading arm 364 from its lower dotted line dead center position in Figure 40 to the full line position where its fingers 369 have moved into the finished work carried by the spindle in the loading position. This motion of the pivot 357 from its lowest to its dead center position has also been sufficient to actuate a valve arm 685, which is provided with two spaced fingers 686 and 687, to the dotted line position shown in Figure 41, a spring pressed dog 689 on the arm 356 having contacted with and moved the finger 686. This opens a connection from the pressure line 651 through this valve and through the pipe 87, through the pipe 76 connected to that spindle which is then at the loading and unloading station, and back of the piston 41 shown in Figure 38, thus to bring the brake up against the head 38, stopping the rotation of the work at this station and releasing the work by axial motion of the plunger 37. Continued motion of the piston 352 to the right continues the rotation of the arm 356 in counterclockwise direction, a lower dog 700 connected by a spring 701 to the dog 689 yielding when it strikes the finger 686 so that it may pass freely thereby. This continued motion of the arm 356 moves the rack bar 360 downwardly, thus moving the loading arm 364 in counterclockwise direction, until it reaches its upper dotted line position shown in Figure 40 where the finished piece of work has been stripped from the fingers 369, as previously described, and where the loading arm is in position to receive a new piece of work which is dropped in position to receive the loading arm as shown in Figure 42. The cam 504 then acts to depress the valve 519, reversing the fluid pressure connections to the cylinder 351 so that the loading arm is swung in clockwise direction, first picking up the piece of work from the supply chute and carrying it into loading position in the chuck. As it is just about to reach final loading position, its dog 700 strikes the finger 687 of the valve 699, exhausting the fluid pressure from the pipe 87 out through the pipe 660 in the exhaust line while the pressure line 651 is cut off. This takes place when the arm 356 is at substantially its dead center position and further motion of the arm 356 below its dead center position acts to retract the loading arm to the lower dotted line position where it is out of contact with the work and in position to permit the work just loaded to be indexed to the first grinding station. There the loading arm remains until after the spider has indexed. The grinding cycle continues until the grinding wheels have been fed to the limit of motion and preferably with a dwell at that limit for "sparking out," whereupon the grinding cycle being finished, the grinding wheels are backed off to avoid scratching the work by backing off of the feed by motion of the pistons 243. This is effected by the valve 515, the cam 500 reaching the full line position in Figure 27, permitting the lug 544 to be pushed into the notch 540 by the spring 570 which pushes the valve 515 upwardly. In this position of the valve, as shown in Figure 32, the several passages 563, 564, 565 which lead to the ports 248 of the feed cylinders 244 are open to discharge through the header discharge passages 523 and 524.

Next the grinding wheels are backed off to rest position by the raising of the valve 518 into the position shown in Figure 36, which connects the ports 620, 622 and 624 leading to the several traversing mechanisms to discharge through the header discharge passage 523. The cam 503 is then in the position shown in Figure 28 with its edge notch in position for the cam follower to ride thereinto.

Next the work spider is unlocked by opening the passage 131 of the locking device to discharge through the valve 517 which is also permitted to rise by its cam follower entering the notch in its cam 502 (see Figure 28). The shaft 6 is then moved to the left to bring the work holders into inoperative position by admitting fluid under pressure to the right hand end of the cylinder 72 (see Figure 4a). This is done through the pipe 710 which leads from the port 600 of the valve 516, this valve now being in its upper position shown in Figure 34, with its actuating lever 577 in the dotted line position of Figure 25. In this position of the valve 516, the passage 600 is in communication with the header pressure passage 522 and the passage 601 is in communication with the discharge passage 524. The fluid under pressure is then discharged from the left hand side of the piston 71 through the throttle valve 711 which leads through the pipe 712 to the passage 601 of the valve 516. During the discharge this throttle valve opens freely past the ball check valve 713. As the piston 71 moves to the left, it uncovers a port 715 which conducts fluid under pressure from the right hand end of the piston 71 to the pipe 716 to the port 717 leading to the back face of the piston 472, which acts to move the cam drive pulley 452 out of clutching relation to the cam shaft, thus stopping the rotation of the cam shaft.

The shaft 6, with the work carriers, continues its backward motion until the indexing plate 100 is brought into indexing relation with the indexing arm 102, previously described, whereupon the retracting motion ceases. As the Geneva wheel 100 is reaching its limit of left hand position shown in dotted lines in Figure 4, its rim 554 strikes on the cam follower 553 and lifts the rod 551, as shown in Figure 27, depressing the roller 545 and the valve 515 to its lowest position, which is shown in Figure 30. This admits pressure from the header pressure line 522 through each of the passages 563, 564 and 565 directly to the wheel feed cylinders 244, by-passing the throttle valves 675 which cause the normal feed of these wheels to be relatively slow. This produces a quick feed motion of the wheels to their limits of feed motion for dressing purposes. This final motion of the Geneva wheel also brings a lug 720, carried by the Geneva wheel, there being one lug for each indexed position, to strike on a latch member 721 which releases a stem 722 (see Figures 2 and 47), this stem having a finger 723 engaging a spring pressed valve 725 similar to the valves 516 and 517. The spring which normally holds this valve 725 projected, similar to the spring 593 of Figures 33 and 34, throws this valve to the condition shown in Figure 34, thus reversing fluid connections to the cylinder 107 and causing the rack 106 to be extended, rocking the arm 102 and indexing the work holders. During the last fifteen degrees of the indexing motion of the Geneva wheel 100, the dressing tools are moved into dressing position, as previously described, and when the arm 102 is about to complete the indexing motion, it strikes on the arm 108 which pulls the core 581 and lifts the arm 577 to the full line position shown in Figure 25 where it is caught by the latch 578 which can spring in over its end 579. This has depressed the valve 516 to the position shown in Figure 33 so that fluid under pressure may pass from the header pressure passage 522 around the valve, through the passage 601, and through the pipe 712 to the throttle valve 711. In this direction of fluid motion, the check valve 713 is seated so that the fluid passing it builds up gradually in the left hand end of the cylinder 72 so as to move the piston 71, and the shaft 6 carrying the work holders, slowly to the right toward operative relation with the grinding wheels. It witll be noted that the dressing tools have all been moved to dressing position by the last portion of the indexing motion of the work holders and that the grinding wheels have been moved out to their limit of feed and with an allowance for wear which has been produced by the impingement on the arm 280 of the lug 281 on the member 282, as previously described, under the heading "Grinding wheel mounting." The grinding wheels, however, have not yet started their traversing motions and before the work holders reach their final operative relation to the grinding wheels, they must be retratced to the start of their feeding positions. This retraction is produced by impingement of the flange 554 of the Geneva wheel 100 on the latch release arm 566 (Figures 1 and 1a) which permits the valve 515 to raise to its highest position, the notch 540 in the cam 500 being then opposite to the lug 544 on the arm 541. The valve is then in the position shown in Figure 32 in which all three passages 563, 564 and 565 are open to the discharge, thus relieving the pressure behind the feed pistons 243, so that the springs 245 may return the pistons 243 to their inner limits of motion with their wheels in the retracted positions. When the shaft 6, with the work holders and the parts carried thereby, have reached their operative positions, the piston 71 has reached the position to open the port 730, allowing fluid under pressure to pass from its left hand side in back of the piston 472 which is moved thereby in a direction to clutch the drive pulley 452 to the shaft 453 and thus start the rotation of the cam shaft 480. As the Geneva wheel 100 with the rim 554 moves with the shaft 6 into operating position, the back face of the rim 554 also strikes a dog 731 fastened to the rear end of the stem 722. This depresses the valve 725 and allows pressure to enter on the left side of the piston 107, thus retracting the indexing arm 102. This completes the cycle of operations of the machine.

From the foregoing description of certain embodiments of this invention, it should be evident to those skilled in the art that various other changes and modifications may be made without departing from the spirit or scope of this invention as defined by the appended claims.

We claim:

1. A machine of the class described comprising, a work holder, a shaft to which said work holder is secured, means supporting said shaft on opposite sides of said holder for axial motion, a tool holder, means for moving said work holder and shaft axially to present work carried thereby to and retract work from operative relation to a tool carried by said tool holder, and means moving said tool holder relative to said work holder when said work holder is in presenting position to cause said tool to act on the work.

2. A machine of the class described comprising, a work holder, a shaft to which said work holder is secured, means supporting said shaft on opposite sides of said holder for axial motion, a tool, means for moving said work holder and shaft axially to present work carried thereby to and retract work from operative relation to said tool, and means for reciprocating said tool parallel to said shaft for traversing work on said holder when said holder is in operative position.

3. A machine of the class described comprising, a work holder, a shaft to which said work holder is secured, means supporting said shaft on opposite sides of said holder for axial motion, a tool, means for moving said work holder and shaft axially to present work carried thereby to and retract work from operative relation to said tool, means for reciprocating said tool parallel to said shaft for traversing work on said holder when said holder is in operative position, and means for moving said tool laterally of its reciprocating path to feed the tool relative to the work.

4. A machine of the class described comprising, a spider, a plurality of work holders carried in circular series about the axis of said spider, a shaft carrying said spider, means supporting said shaft for rotation, a member into which said shaft extends, a plurality of tools carried by said member for operating on work carried by certain of said holders, means for moving said spider axially of said shaft to bring the work holders into and out of operative relation to said tools, means acting when said spider is in axial position with said work holders out of operative positions to index said spider to bring said work holders in succession opposite to each tool, means to reciprocate said tools to effect traverse relative to said work when said spider is in work-hold operative axial position, and means to move said tools transverse to the path of said reciprocation to feed the tools relative to the work.

5. A machine of the class described, comprising a spider, a plurality of rotary work holders carried by said spider, a plurality of tools one for each of certain of said work holders, means for independently reciprocating said tools to traverse work carried by said certain work holders, means for moving said spider to present work to and retract work from operative axial relation to said tool and means for rotating said work holders.

6. A machine of the class described, comprising a rotary and axially reciprocable spider, a plurality of work holders carried by said spider, a plurality of tool carriers one for each of certain of said holders, means individual to each carrier for reciprocating its respective carrier independently of all the other carriers to cause the tools to traverse work on said holders, means for reciprocating said spider to bring said certain work holders into and out of operative relation to tools on said carriers, and means acting when said spider is in its inoperative position to index said spider relative to said tool carriers.

7. A machine of the class described, comprising a rotatable and axially movable shaft, a spider fixed to said shaft, a plurality of work holders carried by said spider in circular series about the axis of said shaft, means to index said spider, a fixed frame member, a plurality of tools carried by said frame member substantially opposite to certain of said work holders in indexed positions for individual motion substantially parallel to said axis and laterally thereof, means for moving said shaft axially to bring said work holders into and out of operative relation to said tools, and means to move said tools.

8. A machine of the class described, comprising a rotatable and axially movable shaft, a spider fixed to said shaft, a plurality of work holders carried by said spider in circular series about the axis of said shaft, means to index said spider, a fixed frame member, a plurality of tools carried by said frame member substantially opposite to certain of said work holders in indexed positions for individual motion substantially parallel to said axis and laterally thereof, means for moving said shaft axially to bring said work holders into and out of operative relation to said tools, means to move said tools, and means for rotating those work holders only which have tools substantially opposite thereto.

9. A machine of the class described comprising a rotary and reciprocable spider, a plurality of rotary work holders carried by said spider, a plurality of tool carriers, one for each of certain of said holders, means for rotating such work holders as have tool carriers, means individual for each carrier for reciprocating its respective carrier independently of all the other carriers to cause the tools to traverse work on said holders, means for reciprocating said spider to bring said certain work holders into and out of operative relation to tools on said carriers, and means acting when said spider is in its inoperative position to index said spider relative to said tool carriers.

10. A machine of the class described, comprising a rotary and reciprocable spider, a plurality of rotary work holders carried by said spider in circular array about the axis of said spider, a plurality of tool carriers, one for each of certain of said holders, means for rotating such work holders as have tool carriers, means individual for each carrier for reciprocating its respective carrier independently of all the other carriers to cause the tools to traverse work on said holders, means for reciprocating said spider to bring said certain work holders into and out of operative relation to tools on said carriers, and means acting when said spider is in its inoperative position to index said spider relative to said tool carriers.

11. In combination, a pair of sets of holders, the holders of one set being work holders and the holders of the other set being tool holders, means for reciprocating holders of one set at variable rates relative to the holders of the other set to effect tool traverse on work carried by said work holders, and means determining the rate of such reciprocation during the entire traverse independently for each reciprocated holder.

12. In combination, a pair of sets of holders, the holders of one set being work holders and the holders of the other set being tool holders, means for reciprocating holders of one set relative to the holders of the other set at variable rates to effect tool traverse on work carried by said work holders, means determining the rate of such reciprocation during the entire traverse independently for each reciprocated holder, and means for moving the holders of the other set axially into and out of operative relation to the reciprocatory holders.

13. In combination, a pair of sets of holders, the holders of one set being work holders and the holders of the other set being tool holders, means individual to the holders of one set for reciprocating such holders relative to the holders of the other set at variable rates to effect tool traverse on work carried by said work holders, means for individually and independently adjusting the rates of such traverse for the several reciprocating holders, and means for moving the holders of the other set into and out of operative axial relation to the reciprocating holders.

14. In combination, a spider rotatable and movable axially, a plurality of work holders rotatably carried by said spider in circular array about its axis, means for adjustably fixing the angular relation of each work holder relative to said spider axis, a plurality of tools, means for producing relative motion parallel to said axis between said tools and holders to effect traverse of said tools and work carried by said work holders, means for rotating said work holders, means for moving said spider axially toward and from cooperative relation between said tools and work holders, and means for indexing said spider.

15. A machine of the class described, comprising a spider, a plurality of rotary work spindles carried by said spider in circular array about the axis of said spider, means for adjusting the angular relation of said spindles to said axis, a drive pulley for each spindle carried by said spider, driving connections from each pulley to its respective spindle operative for all angular adjustments of said spindle, means for rotating said pulleys a plurality of rotary tool spindles, means for moving said spider axially to bring the work into and out of operative relation to tools on said spindles, and means to index said spider to bring each piece of work sequentially to be operated upon by each tool.

16. In a multiple spindle machine, an indexing and axially movable spider, a plurality of holders carried by said spider in circular array about its indexing axis, means for indexing said spider while in one axial position, an element on said spider for each indexed position, a locating element against which said spider elements may engage in succession when said spider is in another axial position to determine the indexed angular positions of said spider, a movable plunger between which and said locating element one of said spider elements passes when said spider is moved from its indexing axial position to said other axial position, and means acting when said spider has reached said other axial position to move said plunger to press said spider element against said locating element.

17. In a multiple spindle machine, an indexing and axially movable spider, a plurality of holders carried by said spider in circular array about its indexing axis, means for indexing said spider while in one axial position, an element on said spider for each indexed position, a locating element against which said spider elements may engage in succession when said spider is in another axial position to determine the indexed angular positions of said spider, a movable plunger between which and said locating element one of said spider elements passes when said spider is moved from its indexing axial position to said other axial position, means acting when said spider has reached said other axial position to move said plunger to press said spider element against said locating element, and means biasing said spider angularly to press said one spider element against said plunger.

18. In a multiple spindle machine, an indexing and axially movable spider, rotary spindles carried by said spider in circular series, means for indexing said spider while in one axial position, an element on said spider for each indexed position, a locating element against which said spider elements may engage in succession when said spider is in another axial position to determine the indexed angular positions of said spider, a movable plunger between which and said locating element one of said spider elements passes when said spider is moved from its indexing axial position to said other axial position, means acting when said spider has reached said other axial position to move said plunger to press said spider element against said locating element, and means for rotating said spindles producing a component of pressure tending to rock said spider in the direction to press said spider element against said plunger.

19. In a machine of the class described, a stationary frame, a plurality of tool heads movably carried by said frame and arranged about an axis, a guide member arranged coaxial with said axis, an element on each head engaging said member, means for reciprocating said heads relative to said guide member in the direction of said axis, and means for adjusting each element relative to its head.

20. In a machine of the class described, a frame, a plurality of grinding wheel heads pivoted to said frame and arranged about an axis, a grinding wheel carried by each of said heads eccentric to its pivot, an abutment eccentric to said pivot and substantially concentric to said axis, an element carried by each of said heads engaging said abutment to determine the position of said wheels, means for adjusting each element with respect to its head, and means for reciprocating said heads axially of said wheels with respect to said frame and to said abutment.

21. In a machine of the class described, a frame, a tool head pivoted to said frame, a tool carried by said head eccentric to said pivot, an abutment eccentric to said pivot, a lever fulcrumed on said head, an element carried by said lever engaging said abutment to determine the position of said tool, and means for moving said lever about its fulcrum to change the position of said tool.

22. In a machine of the class described, a frame, a plurality of tool heads carried by said frame and arranged about an axis for motion toward and from and lengthwise of said axis, a guide member separate from said frame arranged coaxially with said axis and lengthwise of which said tool heads may move, an element on each head engaging said member, and means for moving said heads lengthwise of said axis with said elements slidably engaging said member.

23. In a machine of the class described, a frame, a plurality of tool heads carried by said frame and arranged about an axis for motion toward and from and lengthwise of said axis, a guide member separate from said frame arranged coaxially with said axis and lengthwise of which said tool heads may move, an element on each head engaging said member, and means for moving said heads each independently of the others lengthwise of said axis with said elements slidably engaging said member.

24. In a machine of the class described, a frame, a plurality of tool heads carried by said frame and arranged about an axis for motion toward and from and lengthwise of said axis, a guide member separate from said frame arranged coaxial with said axis and lengthwise of which said tool heads may move, an element on each head engaging said member, means for moving said heads lengthwise of said axis with said elements slidably engaging said member, and means for adjusting each element relative to its head.

25. In a machine of the class described, a frame, a plurality of grinding wheel heads movably carried by said frame and arranged about an axis, grinding wheels carried by said heads, a guide member arranged coaxial with said axis, an element on each head engaging said member, means for moving said heads lengthwise of said axis with said elements slidably engaging said member, means for truing said wheels, means for adjusting said elements relative to said heads to effect a feed of said wheels, and means for producing an adjustment of said elements in addition to said feed adjustment to provide for truing and wheel wear.

26. In a machine of the class described, a frame, a plurality of grinding wheel heads movably carried by said frame and arranged about an axis, grinding wheels carried by said heads, a guide member arranged coaxial with said axis, an element on each head engaging said member, means for moving said heads each independently of the others lengthwise of said axis with said elements slidably engaging said member, means for truing said wheels, means for adjusting said elements relative to said heads to effect a feed of said wheels, and means for producing an adjustment of said elements in addition to said feed adjustment to provide for truing and wheel wear.

27. In a machine of the class described, a frame, a plurality of tool heads pivotally carried by said frame and movable about said pivots from and toward a central axis about which said tool heads are arranged, means for moving said heads substantially parallel to said axis, a guide member coaxial with said axis, an element carried by each head and slidably engaging said guide member for relative motion substantially parallel to said axis as said heads are moved substantially parallel to said axis, and means for adjusting said elements relative to said heads to swing said heads about their pivots.

28. In a machine of the class described, a frame, a plurality of tool heads carried by said frame and arranged about an axis for movement toward and from and lengthwise of said axis, a guide member arranged coaxial with said axis, an element on each tool head engaging a surface of said guide member and determining the spacing of its tool head from said axis, a plurality of work holders arranged in circular array concentric with said axis for holding work to be operated upon by tools carried by said tool heads, and means for moving said tool heads lengthwise of said axis with said elements sliding on said surface.

29. In a machine of the class described, a frame, a plurality of tool heads carried by said frame and arranged about an axis for movement toward and from and lengthwise of said axis, a guide member arranged coaxial with said axis, an element on each tool head engaging a surface of said guide member and determining the spacing of its tool head from said axis, a plurality of work holders arranged in circular array concentric with said axis for holding work to be operated upon by tools carried by said tool heads, means for moving said tool heads lengthwise of said axis with said elements sliding on said surface, and means for adjusting said elements to effect feed of said tools with relation to the work.

30. In a machine of the class described, a frame, a plurality of grinding wheel heads pivotally carried by said frame and movable about said pivots from and toward a spindle axis about which said wheel heads are arranged, grinding wheels on said heads, means for moving said heads substantially parallel to said axis, a guide member coaxial with said axis, an element carried by each head and slidably engaging said member as said heads are moved substantially parallel to said axis, means for truing said wheels, means for adjusting said elements relative to said heads to effect feed motion of said wheels, and means to produce an adjustment of said elements in addition to said feed adjustment to provide for truing and wheel wear.

31. In a machine of the class described, a frame, a tool head pivoted to said frame and movable substantially parallel to its pivot, a tool carried by said head eccentric to said pivot, an abutment eccentric to said pivot, a lever fulcrumed on said head, an element carried by said lever engaging said abutment and movable therealong as said head is moved substantially parallel to said pivot, means for moving said head, and means for moving said lever about its fulcrum to change the angular position of said tool about said pivot.

32. In a machine of the class described, a frame, a grinding wheel head pivoted to said frame and movable substantially parallel to its pivot, a grinding wheel carried by said head eccentric to said pivot, an abutment eccentric to said pivot, a lever fulcrumed on said head, an element carried by said lever engaging said abutment and movable therealong as said head is moved substantially parallel to its pivot, means for so moving said head, means for moving said lever about its fulcrum to change the angular position of said grinding wheel about said pivot, means for dressing said wheel, and means for changing the position of said fulcrum to provide a motion in addition to the movement of said lever about its fulcrum to compensate for truing and wear of said grinding wheel.

33. In a machine of the class described, a frame, a tool head carried by said frame, an abutment, a member carried by said head for sliding engagement with said abutment, means comprising an eccentric element for moving said member relative to said head to thereby move said head relative to said abutment, means for turning said eccentric element, and means for moving said head back and forth along said abutment with said member in contact with said abutment while said eccentric element is being turned in one direction.

34. In a machine of the class described, a frame, a tool head carried by said frame, an abutment, a lever fulcrumed on said head and bearing on said abutment, an eccentric carried by said head and bearing on said lever and acting by its rotation to move said head from or toward said abutment, and means for turning said eccentric.

35. In a machine of the class described, a frame, a tool head carried by said frame, an abutment, a lever fulcrumed on said head and bearing on said abutment, an eccentric carried by said head and bearing on said lever and acting by its rotation to move said head from or toward said abutment, means for turning said eccentric, and means for moving the fulcrum of said lever relative to said head.

36. In a machine of the class described, a frame, a tool head pivoted to said frame, a tool carried by said head eccentric to said pivot, an abutment eccentric to said pivot, a lever fulcrumed on said head, an element carried by said lever engaging said abutment to determine the position of said tool, means for moving said lever about its fulcrum to change the position of said tool, and means for adjusting said fulcrum on said head.

37. In combination, a rotatable and axially movable shaft, a spider fixed to said shaft, a plurality of work holders carried by said spider in circular series about the axis of said shaft, an abutment sleeve carried by said shaft, a plurality of tool carriers pivotally mounted eccentric to said shaft and having elements bearing on said sleeve to determine the position of tools on said carrier relative to work held by said work holders, means for moving said shaft axially, and means for indexing said spider.

38. In combination, a rotatable and axially movable shaft, a spider fixed to said shaft, a plurality of work holders carried by said spider in circular series about the axis of said shaft, an abutment sleeve carried by said shaft, a plurality of tool carriers pivotally mounted eccentric to said shaft and having elements bearing on said sleeve to determine the position of tools on said carrier relative to work held by said work holders, means for moving said shaft axially, means for indexing said spider, tools carried by said carriers, and means for reciprocating said tool carriers to cause said tools to traverse work carried by said holders.

39. In combination, a rotatable and axially movable shaft, a spider fixed to said shaft, a plurality of work holders carried by said spider in circular series about the axis of said shaft, an abutment sleeve carried by said shaft, a plurality of tool carriers pivotally mounted eccentric to said shaft and having elements bearing on said sleeve to determine the position of tools on said carrier relative to work held by said work holders, means for moving said shaft axially, means for indexing said spider, and means securing said sleeve to said shaft with capability of angular adjustment to bring different portions of its surface in position for said elements to engage therewith.

40. In combination, a rotatable and axially movable shaft, a spider fixed to said shaft, a plurality of work holders carried by said spider in circular series about the axis of said shaft, an abutment sleeve carried by said shaft, a plurality of tool carriers pivotally mounted eccentric to said shaft and having elements bearing on said sleeve to determine the position of tools on said carrier relative to work held by said work holders, means for moving said shaft axially, means for indexing said spider, means securing said sleeve to said shaft with capability of angular adjustment to bring different portions of its surface in position for said elements to engage therewith, tools carried by said carriers, and means for reciprocating said tool carriers to cause said tools to traverse work carried by said holders.

41. In a grinding machine, a frame, a grinding head pivoted to said frame, a grinding wheel journaled in said head eccentric to said pivot, an abutment, a lever fulcrumed on said head, an element carried by said lever engaging said abutment, a work holder, means for producing relative traverse between said grinding wheel and work carried by said holder, means acting to swing said lever on its fulcrum to feed the wheel into the work, wheel truing mechanism, means for operating said mechanism to true the wheel at intervals, and means for adjusting the fulcrum of said lever to effect a wheel feed to compensate for wheel wear and truing.

42. In a grinding machine, a frame, a grinding head pivoted to said frame, a grinding wheel journaled in said head eccentric to said pivot, an abutment, a lever fulcrumed on said head, an element carried by said lever engaging said abutment, a work holder, means for producing relative traverse between said grinding wheel and work carried by said holder, means acting to swing said lever on its fulcrum to feed the wheel into the work, wheel truing mechanism, means for operating said mechanism to true the wheel at intervals, and means acting after each wheel truing to adjust the fulcrum of said lever to effect a wheel feed to compensate for wheel wear and truing.

43. A grinding machine comprising an axially movable and rotatable spider, a plurality of work holders carried by said spider, grinding wheels positioned to operate on work carried by certain of said holders, wheel truing devices, a carrier for said devices movable axially with said spider to cause said devices to traverse and true said wheels, said carrier being rockable about the axis of rotation of said spider, means for moving said spider and carrier axially, means for indexing said spider when it is in an axial position wherein said wheels are out of operative relation to work carried by said holders, means connecting said carrier to said spider during at least a portion of said indexing motion to rock said carrier to a position where said devices are in operative alinement with said wheels so that on subsequent axial motion of said spider toward operative relation to said wheels said wheels are trued, and means acting after the truing action and while said spider continues its motion toward operative position to rock said carrier to inoperative position of said devices.

44. A grinding machine comprising an axially movable and rotatable spider, a plurality of work holders carried by said spider, grinding wheels positioned to operate on work carried by certain of said holders, wheel truing devices, a carrier for said devices movable axially with said spider to cause said devices to traverse and true said wheels, said carrier being rockable about the axis of rotation of said spider, means for moving said spider and carrier axially, means for indexing said spider when it is in an axial position wherein said wheels are out of operative relation to work carried by said holders, means connecting said carrier to said spider during at least a portion of said indexing motion to rock said carrier to a position where said devices are in operative alinement with said wheels so that on subsequent axial motion of said spider toward operative relation to said wheels said wheels are trued, means acting after the truing action and while said spider continues its motion toward operative position to rock said carrier to inoperative position of said devices, and means for reciprocating said grinding wheels.

45. A grinding machine comprising a rotatable and axially movable spider, a plurality of work holders carried by said spider, grinding wheels positioned to operate on work carried by certain of said holders, means for feeding said wheels into their respective work pieces, wheel truing devices, a carrier for said devices movable axially with said spider to cause said devices to traverse and true said wheels, said carrier being rockable about the axis of rotation of said spider, means for moving said spider and carrier axially, means for indexing said spider when it is in an axial position wherein said wheels are out of operative relation to work carried by said holders, means connecting said carrier to said spider during a portion of said indexing motion to rock said carrier to a position wherein said devices are in operative axial alinement with said wheel, means acting before said devices reach said wheels to actuate said feeding means to a predetermined extent, means acting after truing has been effected to retract said wheel feeding means, means for reciprocating said wheels to effect traversing of the work, and means for actuating said feeding means at a relatively low rate while said reciprocation continues.

46. In a grinding machine, an axially movable unit comprising a spider and work spindles rotatably supported by said spider in circular array about said axis, grinding wheels for operating on work carried by said spindles, and wheel truing mechanism mounted on said unit.

47. In combination with a work holding magazine, a work holder for holding work during the performance of an operation thereon, and a member for removing a finished work piece from said holder and then taking a piece of unfinished work from said magazine and transferring it to said work holder, operative mechanism for effecting such motion of said member comprising a crank and a reciprocatory element operatively connected to said crank, and means for turning said crank through an arc extending past the dead center position between said crank and element to thereby reverse the direction of motion of said element after one limit of motion has been reached and retract said transfer member from said work holder after having deposited a piece of work from said magazine therein.

48. In a machine of the class described, a rotary spider, a plurality of rotary work holding spindles in circular array in said spider about its axis of rotation, means for indexing said spider to bring said spindles successively into various stations, a tool for operating on work at certain of said stations less than all, one of said stations where no tool is positioned being the work unloading and loading station, means for introducing coolant through each spindle, means for automatically shutting off the flow of coolant to the spindle at said unloading and loading station, means for clamping work in each spindle, and means effective at the unloading and loading station only to open said clamp to release completed work and to close said clamp on a fresh work piece.

49. In a machine of the class described, a grinding wheel holder, a shaft journaled in said holder, a grinding wheel carried on said shaft, means for moving said holder axially of said shaft to reciprocate said wheel in a path of constant amplitude, and means for moving work from and to a definite operative position with respect to said wheel.

50. A machine of the class described, comprising a plurality of fluid pressure actuated mechanisms, a valve for controlling the actuation of each of said mechanisms, a rotary cam shaft, cams on said shaft for actuating said valves, a cam shaft driving means, fluid pressure actuated means for operatively connecting and disconnecting said cam shaft and said driving means, and means actuated by certain of said mechanisms for controlling said fluid pressure actuated connecting and disconnecting means.

51. A machine of the class described, comprising a plurality of fluid pressure actuated mechanisms, a valve for controlling the actuation of each of said mechanisms, a rotary cam shaft, cams on said shaft for actuating said valves, cam shaft driving means, fluid pressure actuated means for operatively connecting and disconnecting said cam shaft and said driving means, means actuated by certain of said mechanisms for actuating a valve while said driving means is operatively disconnected from said shaft, and means actuated by certain of said mechanisms for controlling said fluid pressure actuated connecting and disconnecting means.

52. A multiple spindle machine comprising a spider, a plurality of work holders carried by said spider, a plurality of tool holders, tools carried by said tool holders, fluid pressure means for reciprocating said spider between tooling and non-tooling axial positions, fluid pressure means for indexing said spider, valves for controlling said various fluid pressure means, a cam shaft, cams on said shaft for actuating said valves, and means for rotating said cam shaft.

53. A multiple spindle machine comprising a spider, a plurality of work holders carried by said spider, a plurality of tool holders, tools carried by said tool holders, fluid pressure means for reciprocating said spider between tooling and non-tooling axial positions, fluid pressure means for indexing said spider, fluid pressure actuated means for locking said spider in indexed angular position when in tooling axial position, fluid pressure means for traversing said tools, fluid pressure tool feeding means, valves for controlling said various fluid pressure means, a cam shaft, cams on said shaft for actuating said valves, and means for rotating said cam shaft.

54. A multiple spindle machine comprising a spider, a plurality of work holders carried by said spider, a plurality of tool holders, tools carried by said tool holders, fluid pressure means for reciprocating said spider between tooling and non-tooling axial positions, fluid pressure means for indexing said spider, valve for controlling said various fluid pressure means, a cam shaft, cams on said shaft for actuating said valves, means for rotating said cam shaft, fluid pressure means for operatively connecting and disconnecting said cam shaft and rotating means, means for actuating certain of said valves independently of said cam shaft while said cam shaft is stationary, and means actuated in time with the operation of the machine for operatively connecting said cam shaft and its rotating means to start the cycle of cam control of valve actuations, and for operatively disconnecting said cam from its rotating means on the completion of the cycle of cam control of said valve.

55. A multiple spindle machine comprising a spider, a plurality of work holders carried by said spider, a plurality of tool holders, tools carried by said tool holders, fluid pressure means for reciprocating said spider between tooling and non-tooling axial positions, fluid pressure means for indexing said spider, fluid pressure actuated means for locking said spider in indexed angular position when in tooling axial position, fluid pressure means for traversing said tools, fluid pressure tool feeding means, valves for controlling said various fluid pressure means, a cam shaft, cams on said shaft for actuating said valves, means for rotating said cam shaft, fluid pressure means for operatively connecting and disconnecting said cam shaft and rotating means, means for actuating certain of said valves independently of said cam shaft while said cam shaft is stationary, and means actuated in time with the operation of the machine for operatively connecting said cam shaft and its rotating means to start the cycle of cam control of valve actuations, and for operatively disconnecting said cam from its rotating means on the completion of the cycle of cam control of said valve.

56. A multiple spindle machine comprising a work holder, a plurality of work spindles carried by said holder, grinding wheels for operating on work carried by said work holder, means for effecting relative reciprocation between said wheels and the work, wheel truing devices, fluid pressure means including control valves for controlling the cycle of operations of the machine, a cam shaft having cams for partly controlling said valves, other means having linkage connections to said valves for additionally controlling said valves, and means for driving said cam shaft.

57. A wheel truing mechanism comprising a support having a spring arm, a truing tool carried by said arm, and means for adjustably positioning the free end of said arm relative to said support.

58. A wheel truing mechanism comprising a support having a spring arm extending therefrom, a truing tool carried by said arm intermediate to its ends, and means for adjustably securing the free end of said arm rigidly to said support.

59. A wheel truing mechanism comprising a plate having an opening therethrough, said plate at one side of said opening constituting a spring arm integral with said plate at one end only, means for rigidly securing the opposite end to said plate at an adjustable distance therefrom, and a truing device carried by said arm intermediate to said ends.

JOSEPH B. JOHNSON.
MERTON H. ARMS.